(12) United States Patent
Zheng et al.

(10) Patent No.: US 6,563,452 B1
(45) Date of Patent: May 13, 2003

(54) APPARATUS AND METHOD FOR DETERMINING WIND PROFILES AND FOR PREDICTING CLEAR AIR TURBULENCE

(75) Inventors: L. Lucy Zheng, Ashburn, VA (US); Richard Burne, Ellicott City, MD (US); Dan T. Horak, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/621,170

(22) Filed: Jul. 21, 2000

Related U.S. Application Data

(63) Continuation-in-part of application No. 09/348,726, filed on Jul. 6, 1999, now Pat. No. 6,184,816.
(60) Provisional application No. 60/144,913, filed on Jul. 21, 1999, provisional application No. 60/091,859, filed on Jul. 6, 1998, and provisional application No. 60/097,536, filed on Aug. 21, 1998.

(51) Int. Cl.[7] .............................................. G01S 13/95
(52) U.S. Cl. .............................. 342/26; 342/52; 342/58; 342/195
(58) Field of Search .......................... 342/26, 175, 195, 342/52–58

(56) References Cited

U.S. PATENT DOCUMENTS

| | | | |
|---|---|---|---|
| 4,346,595 A | | 8/1982 | Gary |
| 4,521,857 A | | 6/1985 | Reynolds, III |
| 5,602,543 A | * | 2/1997 | Prata et al. ............... 342/26 X |
| 5,657,009 A | * | 8/1997 | Gordon .................... 342/26 X |
| 5,757,322 A | | 5/1998 | Ray et al. |
| 6,043,756 A | * | 3/2000 | Bateman et al. .......... 342/26 X |

* cited by examiner

*Primary Examiner*—Bernarr E. Gregory
(74) *Attorney, Agent, or Firm*—Honeywell International Inc.

(57) ABSTRACT

A clear air turbulence (CAT) detection system performs a nowcast algorithm to detect CAT along the flight path of an aircraft. The aircraft stores computer simulation information of key storm features and utilizes the information in combination with returns from an on-board weather detection and ranging sensor and limited additional meteorological data to predict CAT properties, such as intensity, location, time and probability of occurrence. The additional meteorological data is provided by on-board sensors and/or data link from ground sources. A nowcast predicting turbulence along the flight path in the near future alerts the pilot to the likelihood of encountering clear air turbulence.

45 Claims, 14 Drawing Sheets

SCENARIO 1:

SCENARIO 2:

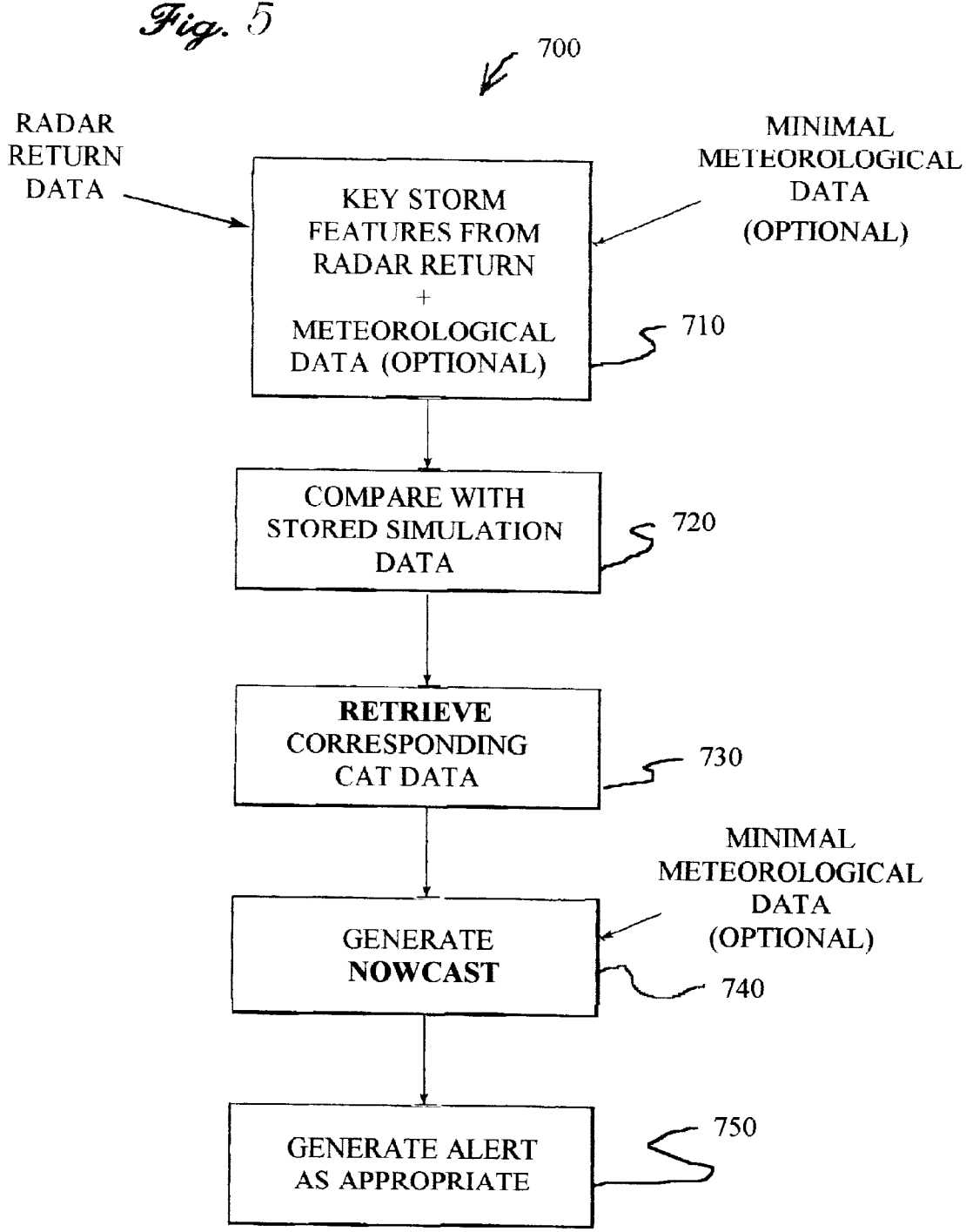

APPARATUS AND METHOD FOR DETERMINING WIND PROFILES AND FOR PREDICTING CLEAR AIR TURBULENCE

CROSS-REFERENCES TO RELATED APPLICATIONS

The application is related to and claims priority from copending U.S. application Ser. No. 60/144,913 for "Nowcast Of Convection-Induced Turbulence Using Information From Airborne Radar And Other Data," filed Jul. 21, 1999; 60/091,859 for "Apparatus and Method for Determining Wind Profiles and for Predicting Clear Air Turbulence," filed Jul. 6, 1998, and No. 60/097,536 having the same title filed Aug. 21, 1998 now copending and a continuation-in-part of U.S. application Ser. No. 09/348,726 filed Jul. 6, 1999 having the same title, Now U.S. Pat. No. 6,184,816.

The application is further related to copending U.S. application Ser. No. 09/620,952, filed on Jul. 21, 2000, which is incorporated herein by reference.

BACKGROUND OF THE INVENTION

This invention relates to the detection of clear air turbulence, vertical windshear and wake vortices; and more particularly, to systems for alerting pilots to the presence of these hazards.

Clear air turbulence (CAT) and wake vortices present potential hazards to aircraft in flight. An aircraft passing through such phenomenon may experience an upset from steady, equilibrium flight. This upset may be severe enough to cause injury to passengers or in severe cases may cause a departure from controlled flight. CAT is a weather phenomenon that is due to vertical wind shear in the atmosphere and usually occurs in temperature inversion layers typically found in the tropopause.

Since the conditions that result in clear air turbulence are not visually apparent nor are they generally detectable by active sensors such as radar, there have been a number of attempts to detect wind shear and clear air turbulence conditions by passive detectors. In particular, attempts have been made to sense air temperature gradients, which are associated with air turbulence, by detecting the radiation emanating from the atmosphere ahead of the aircraft in the infrared and microwave spectral regions. The intensity of the detected radiation varies with the atmospheric temperatures along the line of sight of the detector. Typically these passive systems use a radiometer to measure the thermal radiation from one of the atmospheric gases such as carbon dioxide ($CO_2$), oxygen ($O_2$) or water vapor ($H_2O$) to determine changes in the spatial temperature profile in front of the aircraft. Examples of such approaches based on the infrared emission of $CO_2$ are provided in U.S. Pat. Nos. 3,475,963, 3,735,136, 3,780,293, 3,935,460, 4,266,130, 4,427,306, 4,937,447, 4,965,572, 4,965,573, 5,105,191, 5,276,326 and 5,285,070. Other approaches determine atmospheric temperature by measuring the microwave emission from $O_2$ as described in U.S. Pat. Nos. 3,359,557, 3,380,055, 4,346,595, and 5,117,689.

Systems for measuring atmospheric temperature based on infrared emission from $H_2O$ are described in U.S. Pat. No. 4,266,130 and in the paper by Kuhn et al, "Clear Air Turbulence: Detection by Infrared Observations of Water Vapor" in Science, Vol. 196, p.1099, (1977). In addition, there have been several papers written describing these types of passive infrared systems including: S. M. Norman and N. H. Macoy, "Remote Detection of Clear Air Turbulence by Means of an Airborne Infrared System," AIAA Paper No. 65–459 presented at the AIAA Second Annual Meeting, San Francisco, Calif, Jul. 26–29, 1965; and R. W. Astheimer, "The Remote Detection of Clear Air Turbulence by Infrared Radiation" in Applied Optics Vol. 9, No. 8, p.1789 (1970). In U.S. Pat. No. 4,346,595, Gary describes a microwave radiometer for determining air temperatures in the atmosphere at ranges of about 3 km from the aircraft for the purpose of detecting the height of the tropopause and the presence of temperature inversions. He teaches that by flying the aircraft above or below the tropopause or temperature inversion layer, it is possible to avoid CAT. Since the effective range of the microwave radiometer is relatively short, the system doesn't provide sufficient warning time for the aircraft to avoid the CAT condition. The present invention has detection ranges on the order of 100 km which will allow time for the aircraft to change altitude to avoid CAT.

A number of the above systems were not successful or were only partially successful because they were based solely on the measurement of atmospheric temperature in order to predict the presence of turbulence. A more reliable indication of atmospheric turbulence can be realized by determining the Richardson number, Ri. The use of the Richardson number to determine the stability of the atmosphere is well known in meteorology (see, for example, D. Djuric, "Weather Analysis," Prentice Hall, Englewood Cliffs, N.J. 1994, p. 64). In U.S. Pat. No. 5,117,689, Gary discussed the correlation of the reciprocal of the Richardson number with the occurrence of CAT conditions. The Richardson number, Ri, contains two components: (1) the vertical lapse rate of potential temperature and (2) the wind shear which is related to the horizontal temperature gradient. A number of the prior art discussions measure the vertical temperature lapse rate. Gary used the inertial navigation system (INS) to measure the East-West and North-South components of the wind (the wind shear) along with a microwave radiometer to measure the air temperature vertical lapse rate. This information is then used to calculate the Richardson number or its reciprocal. The deficiency of the system described in this patent (U.S. Pat. No. 5,117,689) is that it determines the Richardson number at relatively close ranges (less than 3 km) and therefore does not provide advance warning of the CAT condition and that it measures the wind shear only at the aircraft.

Previous approaches for the determination of the range and probability of CAT can be summarized as follows:

U.S. Pat. No. 5,276,326 to Philpott determines turbulence as a function of temperature vs. range through the analysis of infrared radiometer signals at two or more discrete wavelengths. The temperature associated with a given range as a function of wavelength is then derived through a matrix inversion process. This transition is difficult and requires noise and error free input data to yield valid results. Gary overcomes the multiple wavelength difficulty in Pat. No. 4,346,595 by measuring effective temperature and range at a single wavelength, however no attempt is made to determine the probability of clear air turbulence using the Richardson number (Ri). In U.S. Pat. No. 5,117,689, Gary teaches the significance of the Richardson number in CAT prediction but does not suggest a method to derive Ri directly from radiometric measurements of horizontal and vertical temperature lapse rates obtained by combining azimuth and elevation scanning with the aircraft motion to produce a temperature map.

The above methods for airborne detection of clear air turbulence require the use of an aircraft sensor. Both infrared and radar sensors have been suggested for use. The practical difficulties involved with implementing these systems are several. First, the extremely small changes in temperature associated with the rising air current must be detected by those systems using infrared sensing. This task can be difficult to accomplish in thermally noisy environments or at long range. Second, such infrared systems require a clear lens to protect the infrared sensor. Real world flight conditions make the protection and maintenance of the lens such that reliable readings could be had costly and difficult. Third, those systems employing radar must have either a dedicated radar or must employ existing aircraft radar originally designed and dedicated for other purposes. Dedicated radar systems, such as LIDAR, tend to be extremely heavy which imposes fuel and capacity costs on the aircraft operator. The operator also must shoulder the additional burden of acquiring and maintaining a separate radar system. Fourth, the sensor is required to sweep out a large expanse of area in to either side of the aircraft and at various ranges in front of the aircraft. This requirement means that the sensor and the associated signal processing system must acquire and analyze a large quantity of data. Detecting the subtle changes indicative of turbulence becomes more difficult at long range. Furthermore, the bandwidth and time dedicated to the sensing activity can become onerous when the sensor is shared with other tasks, or when rapid update rates are desired.

Other solutions for avoiding invisible flight hazards such as CAT involve the use of mathematical atmospheric models. In particular, wake vortices models have been promulgated for several aircraft types. Air traffic controllers in the United States employ these models to develop separation rules such that one aircraft's vortices do not pose a hazard to others. One such model used by controllers is called AVOSS, or Aircraft Vortex Separation System. Such models do not actually detect the presence of vortices or turbulence, but merely indicated theoretical behaviors and regions of likely occurrence.

SUMMARY OF THE INVENTION

The present invention overcomes the various limitations of the prior art by providing a method for using an electronic circuit to generate a clear air turbulence nowcast using meteorological data conveyed as a power return signal from an on-board weather detection and ranging sensor system and minimal additional meteorological data. The method of the invention includes processing the signal from a weather detection and ranging sensor; extracting key features from the weather detection and ranging sensor signal; and modifying or compensating the key features as a function of additional meteorological data. The method of the invention retrieves clear air turbulence information as a function of correlating the compensated key features with predetermined storm features; and generates a nowcast of clear air turbulence as a function of the retrieved clear air turbulence information.

According to one aspect of the invention, the predetermined storm features are retrieved from a stored bank of storm features.

According to another aspect of the invention, the meteorological data are data from either a ground-based radar system or a ground-based lidar system transmitted via data link.

According to another aspect of the invention, the nowcast is generated by operating a short-term weather prediction algorithm. Preferably, the invention nowcasts an intensity, a location, a time, and a probability of occurrence of clear air turbulence. Also, the invention preferably generates an output alert signal as a function of the generated nowcast.

The invention further overcomes the various limitations of the prior art by providing a method for using an electronic circuit to generate a clear air turbulence nowcast using meteorological data conveyed as a power return signal from an on-board weather detection and ranging sensor system and minimal additional meteorological data, wherein additional meteorological data are used to modify result of the nowcast. According this aspect of the invention, the method of the invention uses an electronic circuit; to process the weather detection and ranging sensor signal; and correlate key features extracted from the weather detection and ranging sensor signal to predetermined storm features. The methods of the invention uses the electronic circuit to retrieve clear air turbulence information as a function of the correlation data; retrieve additional meteorological data not discernable by weather detection and ranging sensors, and generate a nowcast of clear air turbulence as a function of the clear air turbulence information and the additional meteorological data.

According to one aspect of the invention, the predetermined storm features are storm features retrieved from a stored bank of storm features.

According to another aspect of the invention, the additional meteorological data include "passive" sensor data, such as temperature, pressure, and wind speed. Alternatively, the additional meteorological data further describe either the maturity or the extent of the weather condition of interest.

According to still another aspect of the invention, the nowcast of clear air turbulence includes the intensity, location, time, and probability of an occurrence of the clear air turbulence.

According to yet another aspect of the invention, the nowcast is generated by operating a short-term weather prediction algorithm.

According to another aspect of the invention, the generates an output alert signal as a function of the nowcast.

According to other aspects of the invention, the various methods of the invention are implemented in respective nowcast systems.

BRIEF DESCRIPTION OF THE DRAWINGS

FIG. 5 illustrates the CAT nowcast method of the present invention.

DESCRIPTION OF THE SPECIFIC EMBODIMENTS

Airborne Sensor Detection

Figure 1A:
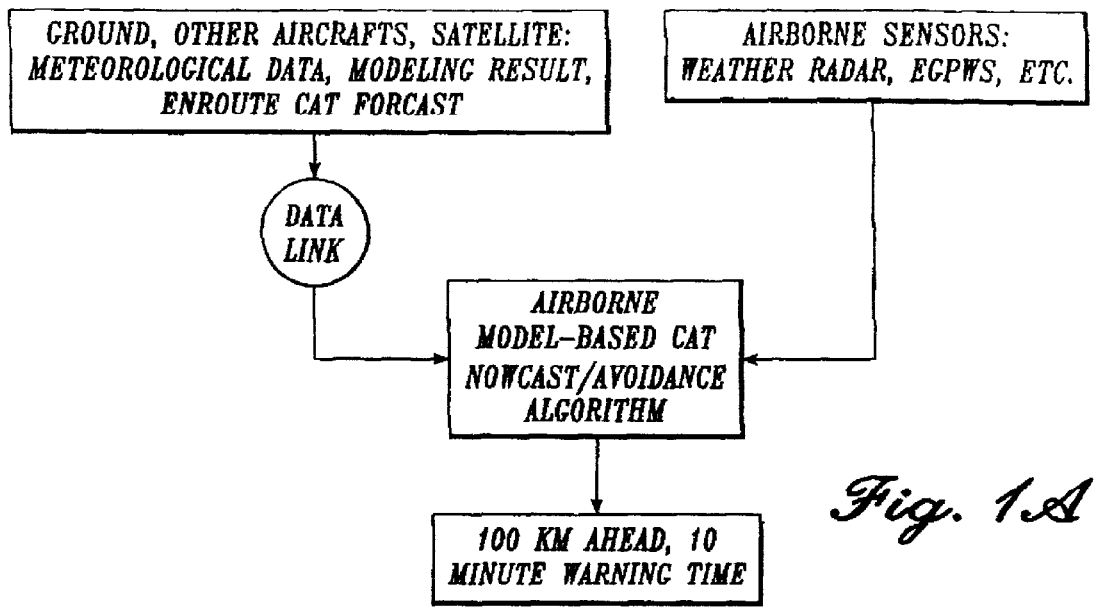
FIG. 1A is a conceptual diagram of a model-based airborne CAT nowcast/avoidance system.

FIG. 1A is a conceptual diagram of a model-based airborne CAT nowcast/avoidance system. Inputs to the model are from data link and/or from on-board sensors.

FIG. 1A illustrates one embodiment of a model-based airborne CAT nowcast/avoidance system. A data link provides large-scale weather information from ground stations and environmental data from other airplanes. An airborne system combines the information from the data link with on-board sensors to enable CAT nowcast for an area about 100 km ahead. This will give pilots about 10 minutes of warning time. The proposed system overcomes the difficulties associated with a purely ground-based uplinking system. Such a system requires a large communication bandwidth and makes the airplane dependent on ground stations and a communication link with the ground. An airborne system combined with selective data-linked inputs will decrease such risk and gives more control to the pilot.

The detection of CAT is a difficult problem. CAT generally occurs as one of four types: turbulence near thunderstorm (TNT), mountain wave turbulence (MWT), clear-air turbulence in the free atmosphere without any visible activity (CAT), and low-level turbulence (LLT). TNT constitutes a large amount of information, the nowcast on TNT requires less real-time computation and does not depend as much on data link information. The algorithms and methodologies developed for TNT and MWT nowcast can be expanded and applied for CAT warning.

Using data from ground and airborne radar, a small-scale model can simulate weather development with sufficient accuracy for TNT nowcast. Given the limited computational capacity on the airplane, a model aimed at a small area along the flight path can be developed by modifying existing large-scale meteorological models. This airborne modeling system takes advantage of all they information it can get from a ground-based system (such as large-scale weather information and modeling results) and reduces the computation complexity by narrowing the field of regard for the on-board modeling and prediction algorithm.

Most existing models are for meteorological research and forecast with large spatial and temporal scale and also stimulate many meteorological parameters not of interest here. An embodiment of the present invention can employ a simplified model to establish an airborne model running on a personal computer that gives information for limited spatial and temporal bounds: about 100 km along the flight path and 10 minutes of warning time to the pilots. A nested-grid modeling approach is used in a preferred embodiment. Most ground-based systems provide 36-km to 12-km regional weather forecast every hour. The result can be used to provide initial and boundary conditions for further air-borne finer-grid modeling. The radar data can be used to correct the coarse-grid modeling result. For example, inaccurate position and speed of a convective supercell forecasted by a ground-based system can be corrected by radar data and more accurate initial and boundary conditions can be formed for further airborne small-scale modeling.

Figure 1B:
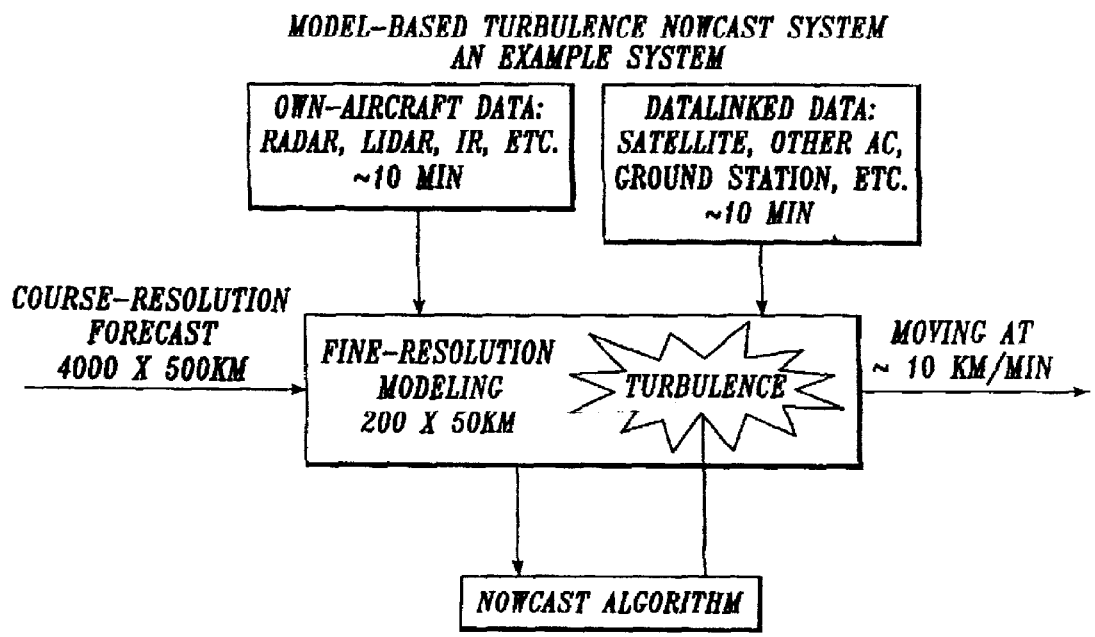
FIG. 1B is a conceptual diagram of an example system for implementing the invention.

FIG. 1B is a more detailed depiction of a preferred embodiment of the invention. Coarse resolution forecasts for large grids, e.g., 4,000 by 500 km are received periodically from land-based weather stations. Own-aircraft observational data such as Radar, Lidar (light detection and ranging), and infrared (JR) as well as data-linked data such as data linked from satellites, other aircraft, or ground stations is updated about every 10 minutes and used to model a nested grid of about 200 by 50 km which is oriented to include the path of the aircraft. The fine resolution modeling data is processed by a nowcast algorithm to determine if CAT is likely to occur in the path of the aircraft.

Several existing models known to those of skill in the art may be modified as described above for use in the present invention. They are NASA's terminal area simulation system (TASS), see, e.g., F. H. Proctor, The Terminal Area Simulation System, NASA Contract Report 4046, 1987, and integrated electromagnetic sensor simulation (IESS), PennState/NCAR's meso-scale model 5 (MM5), see. e.g., Phillip L. Haagenson et al, The Penn State/NCAR Mesoscale Model (MM5) Source Code Documentation, March 1994, the Advanced Regional Prediction System (ARPS), see, e.g., Ming Xue et al., "ARPS Version 4.0 User's Guide," Center for Analysis and Prediction of Storms (CAPS), University of Oklahoma, Norman Okla. 1995.

The uplinked data transmitted to the aircraft from ground stations contains information on possible vortex characteristics and/or weather phenomenon. The ground based radar systems may include weather, wake vortices and/or turbulence detection information.

In a preferred embodiment of the invention, this information is combined or utilized on-board the aircraft to develop a real time airborne model of where these hazardous phenomenon are likely to be encountered. The predictive model can be used to assert an aural and/or visual warning to the pilot.

In a preferred embodiment, this predictive model is combined with detection. The predictive model is employed by the invention to direct the sensor system to scan those areas of interest. Thus, the present invention has the advantage of providing faster update rates than would be available in a prior art system. The present invention has the further advantage of minimizing the number of radar scans that must be dedicated to this task when the radar or sensor is shared amongst various data gathering functions.

The information uplinked to the airborne detection system assists that system in defining the particular indicia of the turbulence hazard. This information enables the present invention to better discriminate amongst the sensor data and improves the reliability that a hazard will be detected. In addition, this information reduces the chances that a false warning will be output to the pilot. As is well known to those of skill in the art, frequent false, or nuisance, warnings cause the cockpit crew to ignore subsequent and possibly valid warnings. Therefore, it is desirable to reduce the number of false alerts in the manner taught by the present invention.

In one embodiment, the invention contains a database of terrain information. Optionally, this terrain data may also be uplinked to the aircraft via a communications link or may be contained in an existing aircraft system, such as, for example, on Enhanced Ground Proximity Warning System (EGPWS) or a navigation database. Terrain data may also be acquired via terrain data scans of the on-board weather radar. The terrain data may be used by the predictive modeling system of the present invention to identify areas of possible turbulence hazards or to assist in modeling the propagation of wake vortices and dissipation of turbulence. Such information would be particularly useful in the vicinity of airports during the landing and takeoff phases of flight.

Data uplinked to the aircraft may be uplinked via satellite telecommunications systems as known to those of skill in the art. The data uplink may also occur via known and existing on-board telecommunications devices such as ACARS or HF radio communications links. Optionally, the present invention may include its own dedicated hardware for receiving these information updates.

Warnings provided to the pilot may include an aural and/or visual warning. In one embodiment, the visual warning includes icons that symbolize various types of weather phenomenon including clear air turbulence and vortices. In another embodiment of the present invention the visual display includes icons overlaid on top of the weather radar picture.

Figure 1C:
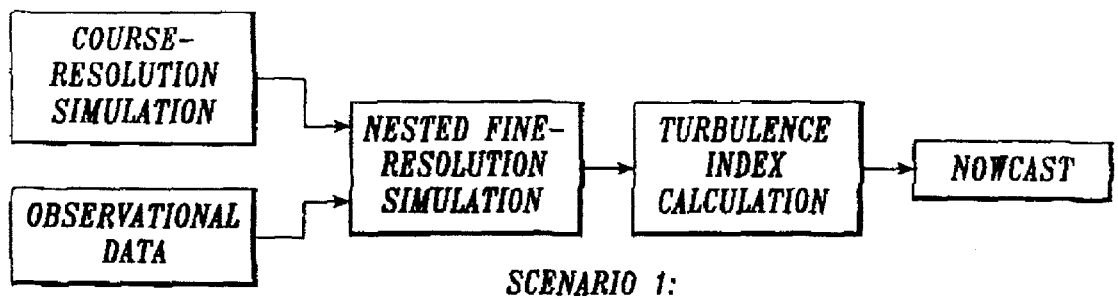
FIG. 1C is a flow chart depicting the steps of a first embodiment of the invention.
Figure 1D:
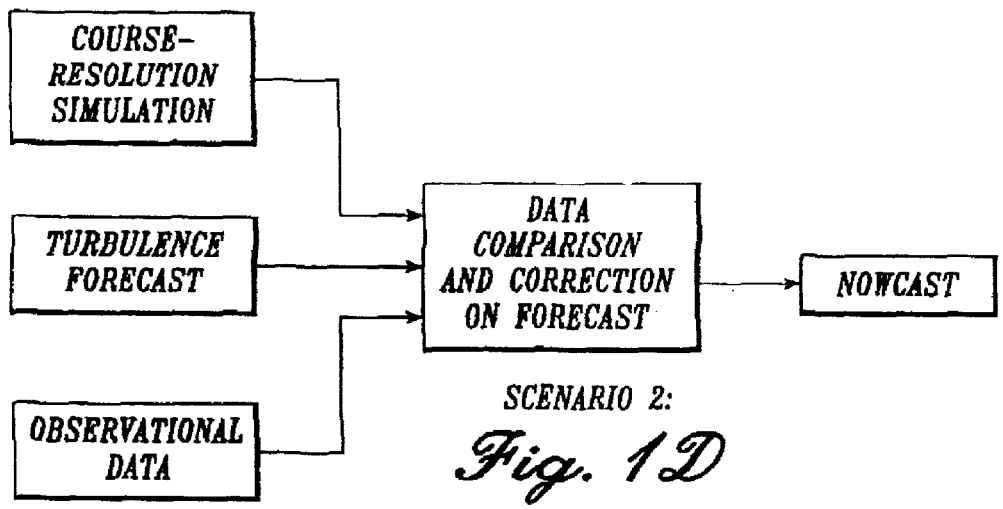
FIG. 1D is a flow chart depicting the steps of a second embodiment of the invention.

Alternative preferred embodiments of a computational method are depicted in FIGS. 1C and 1D. Referring first to FIG. 1C, coarse resolution simulation data and observational data are provided to the on-board computer which then performs a nested fine-resolution simulation of atmospheric conditions along the aircraft flight path. This fine resolution data provides the parameters to perform a turbulence index calculation which is the basis of a "nowcast" provided to the aircraft crew updating them on the possibility of encountering CAT. The coarse resolution data provides a "forecast" of weather events over a long period, e.g., 24 hours, whereas a "nowcast" provides much more accurate predictions of weather phenomena in the very near future, e.g., 10 to 30 minutes. The various functions performed will now be described.

Coarse resolution simulation data may be provided to the aircraft either through a data link or be pre-loaded into the aircraft prior to take-off. A "snapshot" of data could be stored in no more than 6 MB in compressed form and could include data covering, for example, an area of 4,000 by 500 km with 36-km horizontal resolution and 20 layers of vertical resolution. A snapshot data includes all the simulation parameters for each point in 3-D grid space. If the computer is to be pre-loaded with hourly forecast data for 10 hours of flight time, the total amount of data would be about 60 Mb. Forecast data from the National Center for Environmental Prediction (NCEP) is readily available for this purpose.

During flight, observation data will be gathered to the airborne computer. These data could be gathered by detectors such as radar, lidar, infrared remote sensors, and other temperature and wind sensors. The data could also be gathered by sensors from satellites. The detectors could either be located on the aircraft, on other aircraft near the flight path, ground stations, or on satellites. A data link is used to transmit data from locations not on the aircraft to the aircraft. Data conditioning and interpolation will be applied to eliminate bad data points and to fill in empty points. Meteorological data variables are computed from these data to be used for fine-nested grid simulation.

The observational data and coarse-resolution data are used for nested fine-resolution simulation. The coarse resolution data, e.g., forecast data from NCEP, is used to initialize the coarse grid and establish boundary conditions and initial parameters for modeling fine grids, nested within the coarse grids, to improve the data. Mathematical systems for performing nested grid modeling include the Advance Regional Prediction System (ARPS), Xue et al., "ARPS User's Guide Version 4.0," Center for Analysis and Prediction of Storms (CAPS), 1995 and NCAR'S Clark-Hall Code Model, Clark et al., "Source Code Documentation for the Clark-Hall Cloud-Scale Model Code Version G3CH01," NCAR, Boulder, Colo., 1996.

The meteorological variables calculated by the nested grid simulation are utilized to calculate the turbulence index. Particular variables used include turbulence kinetic energy (TKE), Richardson's number (see below), vertical windshear, the deformation index, eddy dissipation rate, TI2, etc. The turbulence index is defined as the weighted and normalized summation of various combinations of the these parameters. Weighting factors are assigned by using experience formulae, which are developed by comparing the numbers against available flight data with real turbulence encounters. The values depend on the location of the aircraft (mountainous or flat terrain), seasons, and other parameters.

The nowcast is based on the value of the calculated turbulence index. If the calculated turbulence index for a location along the flight path exceeds a pre-defined turbulence threshold then a turbulence warning will be issued for its location, time, and intensity.

Referring now to FIG. 1D, this method requires less computational power from the aircraft computer. As in the method of FIG. 1C, coarse resolution simulation and observational data is provided. In this case a turbulence forecast is also provided. The on-board computer utilizes the observational information to correct the forecast to generate a nowcast.

Many agencies and service centers issue aviation turbulence forecasts based on coarse-resolution modeling results. The accuracy may be poor due to the nature of the forecast, i.e., relative long time span, low resolution, and local weather phenomena not included in simulation. However, the forecast result can be used together with observational data to improve its accuracy and give a good nowcast product.

The accuracy of the coarse-resolution turbulence forecast can be improved by comparing observational data with coarse-resolution data because errors in the forecast can be corrected by results of localized observations. For example, the forecast may predict turbulence in location (x,y) at time t, with associated wind and temperature profiles in an area A. However, the observational data may indicate similar wind and temperature profiles but in a different area B. This difference may be caused by inaccuracies in coarse-resolution simulation. By comparing the two sets of data, the airborne computer may issue a turbulence warning at a shifted location from area A. Another example is when the coarse-resolution data and observational data have overlapping meteorological profiles, but with different intensities. This will lead to turbulence nowcast with increased or decreased severity than previously forecast.

Figure 1E:
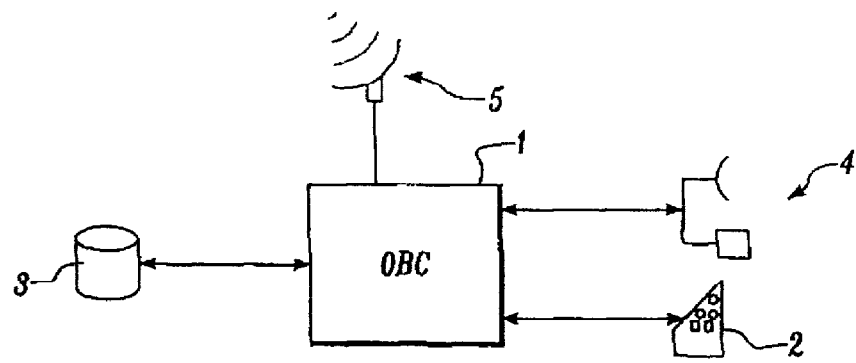
FIG. 1E is a block diagram of a preferred embodiment.

An on-board system for providing a CAT nowcast is depicted in FIG. 1E. An on-board computer (OBC) 1 executes software that implements the nested grid algorithm and CAT nowcast as described above. This nowcast information is provided to cockpit instrumentation 2 which provides aural or visual CAT nowcast alerts to a pilot. On-board storage 3 is used to store pre-loaded coarse simulation data, terrain database information, and program code. On-board sensors 4 and a data-link 5 provide observational data to the OBC 1. Further, the data-link can be used to provide coarse simulation data or program code to be stored in the on-board storage. All or some of the elements of the system depicted in FIG. 1E may be located on-board the aircraft.

Figure 2A:
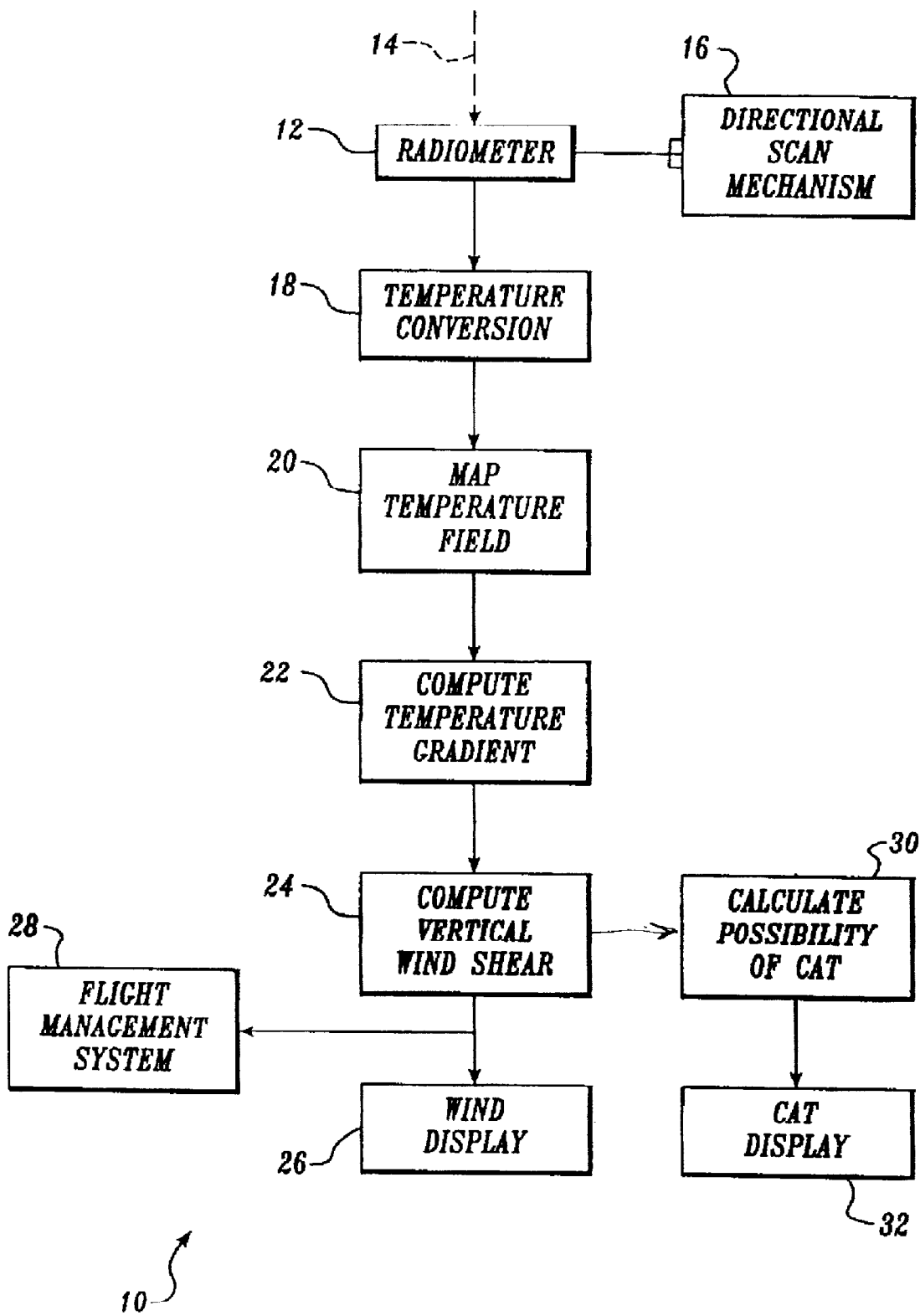
FIG. 2A is a functional block diagram of a CAT sensing system according to an embodiment of the invention.

FIG. 2A provides an overview, in the form of a functional block diagram, of the operation of an airborne sensing device 10 for installation in an aircraft to detect wind vector difference and clear air turbulence.

As described above, the information generated by the airborne sensing device 10 may be utilized as observational data to refine coarse simulation data in the nested grid approach or to refine CAT prediction data. Alternatively, the sensor data may be independently processed to predict the occurrence of CAT along the flight path of the aircraft.

Installed in a forward and partially sideways-looking: location of the aircraft, such as the nose or a leading portion of a wing, is a passive detector 12, preferably a radiometer, for receiving infrared radiation from the atmosphere as indicated by a dashed line 14. Also, as indicated by a block 16, the radiometer 12 is connected to a directional scanning mechanism which permits the radiometer 12 to receive the radiation 14 from different directions in both the azimuth and vertical directions or in only the azimuth direction.

Shown at block 18, the apparatus 10 converts the sterance or energy L at a particular wave length $\lambda$ of the radiation 14 as detected by the radiometer 12 into a value $T_{e\!f\!f}$ which represents the temperature of the atmosphere at an effective range $R_{e\!f\!f}$ from the aircraft. The concept of converting the radiation 14 into temperature $T_{e\!f\!f}$ and the effective range $R_{e\!f\!f}$ will be described below.

Figure 2B:
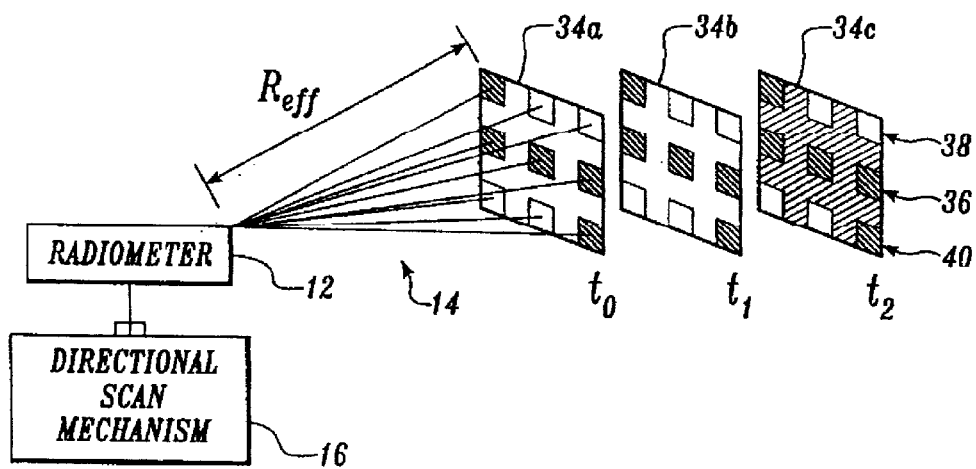
FIG. 2B is pictorial representation of a scanning array illustrating the operation of a radiometer in the invention of FIG. 2A at three time intervals according to an embodiment of the present invention.

Then, as indicated at a block 20, the $T_{e\!f\!f}$ values obtained will be used to create a horizontal or vertical temperature map of atmospheric temperature ahead of the aircraft as illustrated in FIGS. 2B–2G. As the aircraft progresses along its line of flight, the system data is collected as shown in FIG. 2B. The apparatus then generates a temperature map as indicated at 20.

The temperature mapping 20 is used to compute horizontal temperature gradients $\nabla T$, indicated at a block 22, between the temperatures T, contained in the map 20 in a horizontal plane.

As represented by a block 24 and discussed below, the horizontal temperature gradients $\nabla T$ can be used to compute vertical wind vector difference for flight levels ahead as well as above and below the aircraft.

Effective use of the wind vector difference information generated at 24 can be made, as shown at a block 26, by displaying the wind vector difference at flight levels above or below the aircraft in order to provide the air crew with information as to winds that might be more favorable. This information 24 can also be used as an input to a flight management system, indicated by a block 28, so that it can be combined with other flight parameters to provide guidance as to the most efficient flight regime. In addition, this information 24 can be used to compute the probability of clear air turbulence, as indicated by a block 30 that in turn can be used as an input to a clear air turbulence display or warning system as shown by a block 32.

The following is a more detailed description of the various elements and concepts of the invention as shown in the block diagram of FIG. 2A.

For example, FIG. 2B provides an illustration of the operation of the radiometer 12 in conjunction with the directional scan mechanism 16. In this case the scan mechanism 16 directs the radiometer 12 so as to receive radiation 14 from what in effect are 3×3 arrays 3a, 34b and 34c of points in the atmosphere ahead of the aircraft collecting sterance associated with an effective range $R_{e\!f\!f}$ at time intervals $t_0$, $t_1$ and $t_2$. In the preferred embodiment of the invention, a middle row 36 of the arrays 34a–c is located at the aircraft's flight level while an upper row 38 is located at a level intermediate between the flight level and an upper flight level and a lower row 40 is located at a level intermediate between the flight level and a lower flight level. An illustration of the flight levels is provided in FIG. 2G. The radiometer 12 can be any suitable commercially available radiometer or a radiometer of the type described in the above referenced patents such as U.S. Pat. No. 4,937,447 to Barrett, which is hereby incorporated by reference. In another preferred embodiment, only one horizontal temperature map at one level is used for determining wind difference.

Figure 2C:
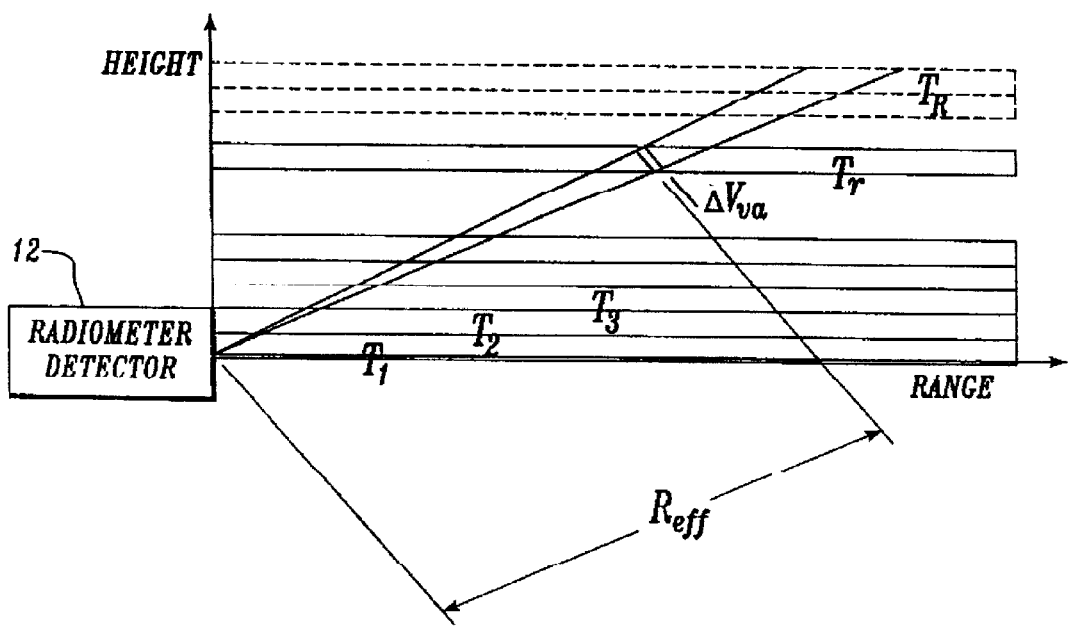
FIG. 2C is a pictorial representation of a section of the atmosphere illustrating the operation of the radiometer of FIG. 2A according to an embodiment of the present invention.

Referring also to FIG. 2A and FIG. 2C, the temperature conversion 18 of each point in the arrays 34a–c is accomplished by translating the radiance $L(\lambda)$ received by the radiometer 12, where the wavelength is $\lambda$, into a signal that is associated with a temperature $T_{e\!f\!f}$ of the volume of air seen by the radiometer. The temperature, $T_{e\!f\!f}$, is associated with the effective range, $R_{e\!f\!f}$ which is the weighted average distance of the signal reaching the radiometer 12. This use of $R_{e\!f\!f}$ is only useful in conditions for which $R_{e\!f\!f}$ does not vary significantly during aircraft flight across reasonable distances at a fixed altitude. It has been found that $R_{e\!f\!f}$ does not vary significantly for normal flight conditions, i.e., $R_{e\!f\!f}$ is determined by only the wavelength $\lambda$, the altitude and latitude of the aircraft and the particular time of year. This has been verified through the use of the FASCODE program. The FASCODE program is a computer model of atmospheric transmission and radiance in the infrared. This program is described and identified in the aforementioned Barrett, U.S. Pat. No. 4,937,447. The following Table 1 is a table illustrating the FASCODE (using the mid-latitude, winter atmosphere program) computed effective range $R_{e\!f\!f}$ vs. $\lambda$ in the case that $\lambda$ falls within the preferred band of wavelengths of $CO_2$ emission for a zenith angle of 90 degrees and an altitude of 35,000 ft.

TABLE 1

| Wavelength ($\mu$m) | Effective Range (km) |
| --- | --- |
| 12.2 | 121 |
| 12.3 | 106 |
| 12.4 | 98.2 |
| 12.5 | 84.4 |
| 12.6 | 76.6 |
| 12.7 | 91.8 |
| 12.8 | 105 |
| 12.9 | 106 |
| 13.0 | 89.3 |

It has been found that the wavelength 12.2 $\mu$m of $CO_2$ is particularly effective at measuring $T_{e\!f\!f}$ associated with a range $R_{e\!f\!f}$ of approximately 120 km for one altitude and latitude. It should be noted that one of the advantages of the invention is that it makes use of previously computed values of $R_{e\!f\!f}$ so that it is possible to provide accurate maps of atmospheric temperature. Also it is possible to store tables of $R_{eff}$ vs. Altitude and λ vs. $R_{eff}$ such as shown in the Table 1 above in order to adjust the sensitivity of the system and the effective range for various conditions. Alternatively, it is possible to use more than one wavelength λ to measure more than one $T_{eff}$ at corresponding ranges $R_{eff}$ from the aircraft.

The radiance L(λ) detected by the radiometer 12 is a function of the temperature of the naturally occurring $CO_2$ in the atmosphere. It is possible to associate the temperature of the air in $\Delta V_{vol}$ shown in FIG. 2C with a given signal. The total signal, L(λ), is the sum of the contributions, $L(\lambda)_i$ of signal from each volume element i along the line of sight of the radiometer 12.

Thus $$L(\lambda) = \sum_i L(\lambda)_i = \sum_i S_i \tau_i \qquad (1)$$

where $S_i$ is the radiance intercepted by the detector from a volume element i and $\tau_i$ is the transmission of the radiance between the volume element i and the detector. The temperature $T_{eff}$ is associated with L(λ), where $T_{eff}$ is the temperature of a blackbody source which produces the same radiometer signal as L(λ). The effective distance $R_{eff}$ is defined according to the equation $$R_{eff} = \frac{\sum_i R_i L(\lambda)_i}{\sum_i L(\lambda)_i} \qquad (2)$$

indicated at 18 of FIG. 2A, the temperature $T_{eff}$ is associated with $R_{eff}$ and a map is generated at 20 with the temperature $T_{eff}$ at a distance $R_{eff}$ in the appropriate direction from the aircraft. For normal flight conditions, $R_{eff}$ does not vary significantly and is determined only by altitude and latitude for a given time of year. With respect to FIG. 2C, the altitude of $\Delta V_{vol}$ for a $R_{eff}$ of 120 km will be about 1000 ft. above the flight level of the aircraft due to the earth's curvature assuming the radiometer 12 is directed toward the horizon.

Figure 2D:
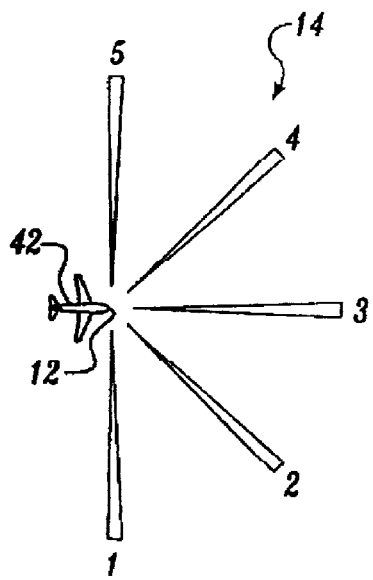
FIG. 2D is a pictorial representation of an aircraft operating the radiometer of FIG. 1 in a horizontal scan mode according to an embodiment of the present invention.
Figure 2E:
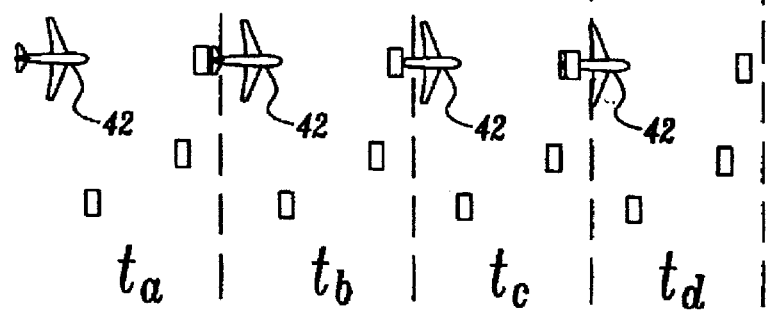
FIG. 2E is a pictorial representation of an aircraft acquiring a horizontal temperature map according to the invention of FIG. 2A.
Figure 2F:
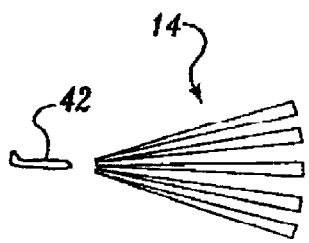
FIG. 2F is a pictorial representation of an aircraft operating the radiometer of FIG. 1 in a vertical scan mode according to an embodiment of the present invention.

FIGS. 2D–2F illustrate how the temperature mapping 20 can be accomplished. In FIG. 2D, an aircraft 42 having the radiometer 12 mounted in its nose causes the radiometer 12 to perform an azimuth scan of 180°. At each of the five positions shown in FIG. 2D, the radiometer 12 will detect the radiance 14. In this manner a horizontal temperature map is generated. The radiometer can detect signals sufficiently fast that the motion of the aircraft can be ignored. FIG. 2E shows a series of locations indicated by a set of rectangular boxes $44_{a-d}$ that correspond to a set of time intervals $t_{a-d}$ as the aircraft 42 proceeds along its flight path, where the temperatures $T_{eff}$ detected for each location $44_{a-d}$ can be stored in memory. Similarly, as illustrated in FIG. 2F, the radiometer 12 in the aircraft 42 can perform a vertical scan so that temperatures of locations above and below the flight path can be mapped. As a result, it is possible to generate temperature maps for horizontal planes above and below the aircraft 42.

By mapping the temperature fields 20 as described above, it is possible to compute horizontal temperature gradients ∇T as indicated at 22 of FIG. 2A. It is also possible, by using the vertical temperature mapping to calculate the temperature lapse rate ∂T/∂z for use in calculation of the Richardson Number for computing the probability of clear air turbulence.

Figure 2G:
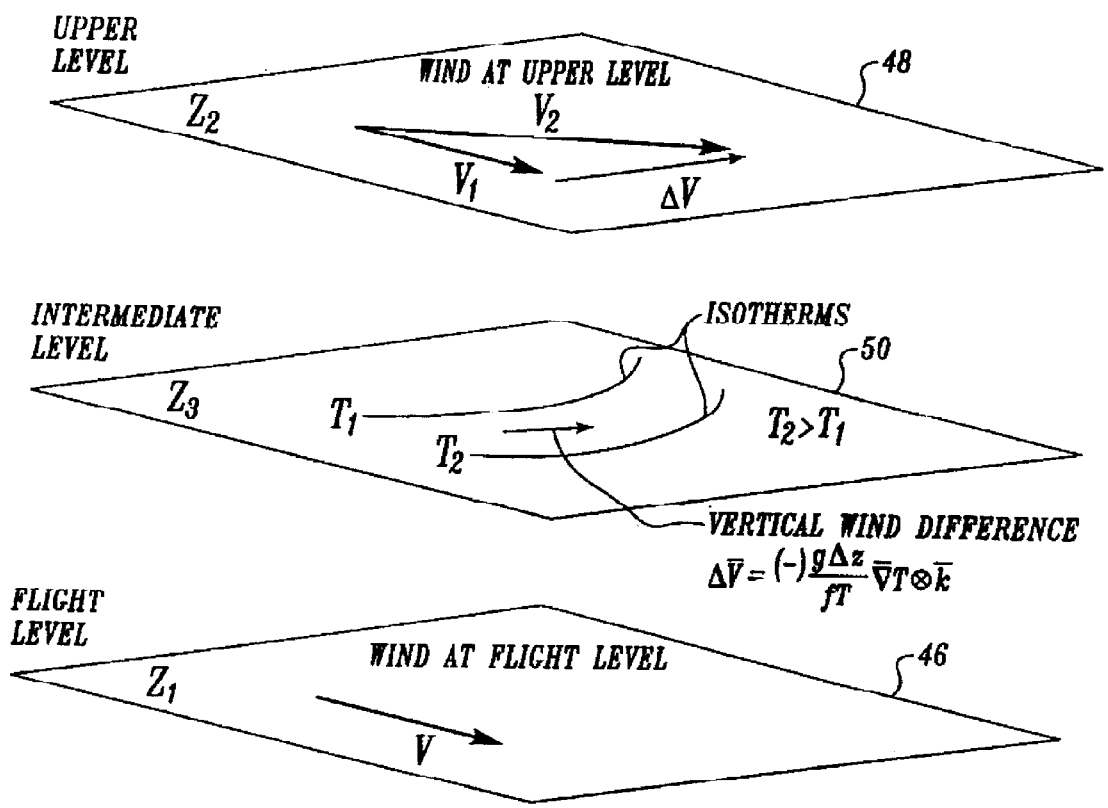
FIG. 2G is a pictorial representation of the determination of the direction and velocity of wind at a level above the flight level of the aircraft according to an embodiment of the present invention.

As is illustrated by the representation of FIG. 2G, one of the salient features of the invention is the capability of utilizing the temperature gradients computed at 22 to generate values representing vertical wind vector difference or horizontal winds at various flight levels. In this case, only a horizontal mapping at one level is needed. For example, a method according to the invention whereby the thermal wind concepts can be used to compute vertical wind vector difference, ΔV, as indicated at 24 of FIG. 2A, makes use of the following relation:

$$\Delta V = -\left[\frac{g\Delta z}{fT}\right]\nabla T \otimes k \qquad (3)$$

where g is the acceleration due to gravity, Δz is the distance between $Z_1$ and $Z_2$, f is the Coriolis parameter resulting from the earth's rotation, T is the temperature at said flight altitude $Z_1$, ∇T is the vector representing the temperature gradient at the intermediate level $Z_3$ between $Z_1$ and $Z_2$, k is the unit vector parallel to the aircraft's local vertical and the symbol ⊗ represents the vector cross-product operator. In FIG. 2G, $Z_1$ denotes the current flight level of the aircraft, $Z_2$ denotes the flight level above the aircraft and $Z_3$ denotes the intermediate level. Equation 3 may be found in any standard meteorological text such as "Dynamical and Physical Meteorology," by G. J. Haltiner and F. L. Martin, (McGraw-Hill, New York, 1957) p. 204.

As a result, once the temperature gradients are computed 22 from the temperature field 20 the value of ΔV can be computed at 24 for the upper flight level 48 per equation (3). For an aircraft direction vector, $V_{ac}$, the vector dot product, $\Delta V \cdot V_{ac}$, is the increase in headwind or tailwind the aircraft would experience at the different altitude. In addition, the vector value ΔV can then be added to the vector value $V_1$ of the wind at the current flight level 46 to obtain a vector value $V_2$ which represents the direction and speed of the wind at the upper flight level 48. This value then can also be displayed on the display 26 in order to provide the air crew with information as to the wind at the upper flight level 48. Alternatively, the display 26 can be used to display just the difference in wind speed along the direction of the aircraft's flight at the upper flight level 48, for example by displaying a simple plus or minus sign along with a value representing the difference in velocity. In addition, the value of $V_2$ can be used as an input to the flight management system 28 so that factor can be used by the system 28 in determining the most efficient flight regime. Note that the temperatures are only needed in one horizontal plane to determine ∇T, and the wind difference, ΔV.

It will be understood that the above discussed method of determining wind direction and velocity $V_2$ at the upper flight level 48 would also apply to the determination of wind at a lower flight level below the current flight level 46. In this manner, it is possible to provide on the display 26 or to the flight management system 28 an indication of the winds both above and below the aircraft so that the crew can take advantage of this information in selecting the most fuel efficient altitude.

Another feature of the invention relates to the use of the temperature mapping function 20 along with the computation of vertical temperature gradients 22 to compute the probability of clear air turbulence 30. In particular, the vertical temperature mapping 20 can be used to calculate the lapse rate ∂T/∂z for determination of the Richardson number Ri which is correlated with turbulent conditions. In this case Ri is computed using the following relations:

$$Ri = \left(\frac{g}{\theta}\right)\frac{\left(\frac{\partial \theta}{\partial z}\right)}{\left|\frac{\partial V}{\partial z}\right|^2} \quad (4)$$

where $$\theta = T\left\{\frac{1000}{p}\right\}^{\frac{R}{C_p}} \quad (5)$$

and where θ is the potential temperature, ∂θ/∂z is the vertical gradient of the potential temperature, ∂V /∂z is the vertical wind shear, g is acceleration due to gravity, V is the horizontal wind vector, z is height, T is temperature in Kelvin, p is atmospheric pressure in millibars, R is the universal gas constant and $C_p$ is the specific heat of air at constant pressure. The Richardson number, Ri, is a measure of the probability of CAT. For Ri below 0.21, atmospheric turbulence occurs and CAT is likely. Severity of CAT increases with decreasing Ri. Referring again to FIG. 2A, the probability of clear air turbulence is determined at 30 with the result displayed on the CAT display 32.

The embodiment of the invention in FIG. 2A has been described in terms of its use in connection with an aircraft traversing temperature fields in its flight path. However, this type of apparatus can also adapted for use in mapping temperature fields from a fixed geographical position. By using the radiometer 12 at a fixed site to scan temperature at the effective range $R_{eff}$ as described above over a period of time as the weather moves over the radiometer, it is possible to generate a map of the temperature fields for a wide area. The temperature map can then be used for warnings of wind conditions such as clear air turbulence and dry microburst conditions. Another use at a fixed position is to scan the temperature field in 360° azimuth and in elevation to determine wind differences, or CAT at one time.

Radar Sensing

The present invention may also incorporate the existing and/or a dedicated aircraft radar sensor to scan for significant weather such as CAT ahead of the aircraft. Management of the existing weather radar scans to search for CAT type conditions are preferably interleaved with the scans normally conducted by the weather radar during routine weather scans. U.S. Pat. No. 5,831,570, incorporated by reference, describes one possible interleaving technique. Other techniques are possible.

In another embodiment of the invention, the radar sensor, which may be an HF, VHF or ionosonder-like device senses atmospheric ionization resulting from CAT and/or windshear events. Friction between moving air masses results in ionization that causes localized changes in the maximum radio frequency that will propagate in that region. This property can be used to sense versions of clear air turbulence even in dry air.

The data from the aircraft radar sensor can be utilized as observational data to refine coarse simulation data utilizing the nested grid algorithm or to refine turbulence forecasts to provide a CAT nowcast. Further, coarse simulation data can be utilized to determine areas of high CAT probability and to direct the radar to preferably scan those areas.

Tilt Control

To maximize the number and types of data scans the radar can make, automation of the radar scan or tilt controls are desirable. This automation reduces pilot workload and better enables the radar to perform multiple tasks.

Figure 3A:
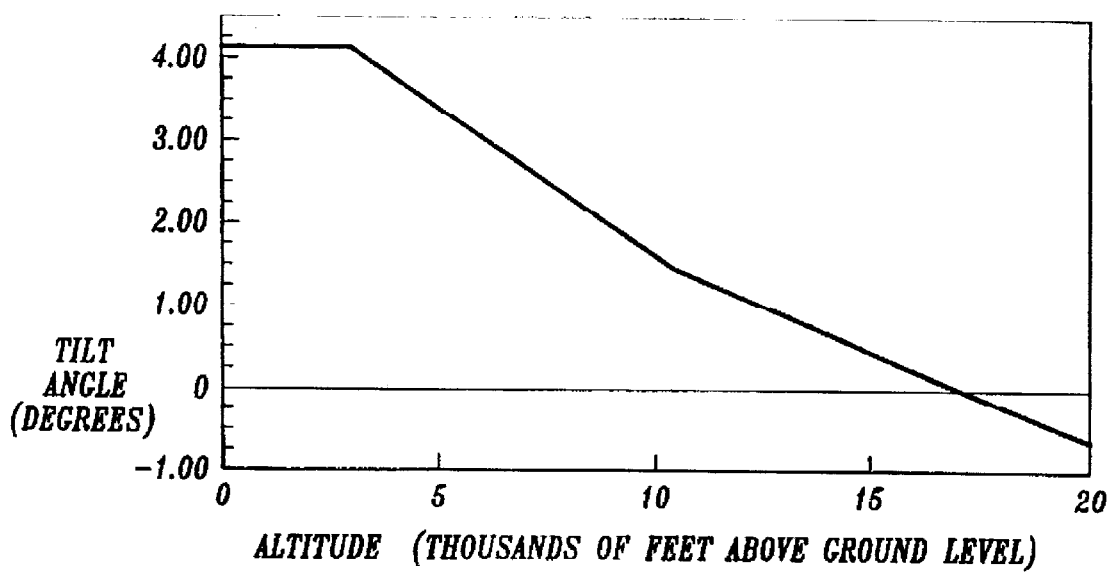
FIG. 3A shows tilt angle as a function of altitude for take-off and landing.

An automated scan management and tilt control may be provided in any one of a number of ways. In one embodiment of the invention, the radar may utilize a predetermined schedule of tilt angles according to height above ground and flight phase as depicted in FIG. 3A.

Figure 3B:
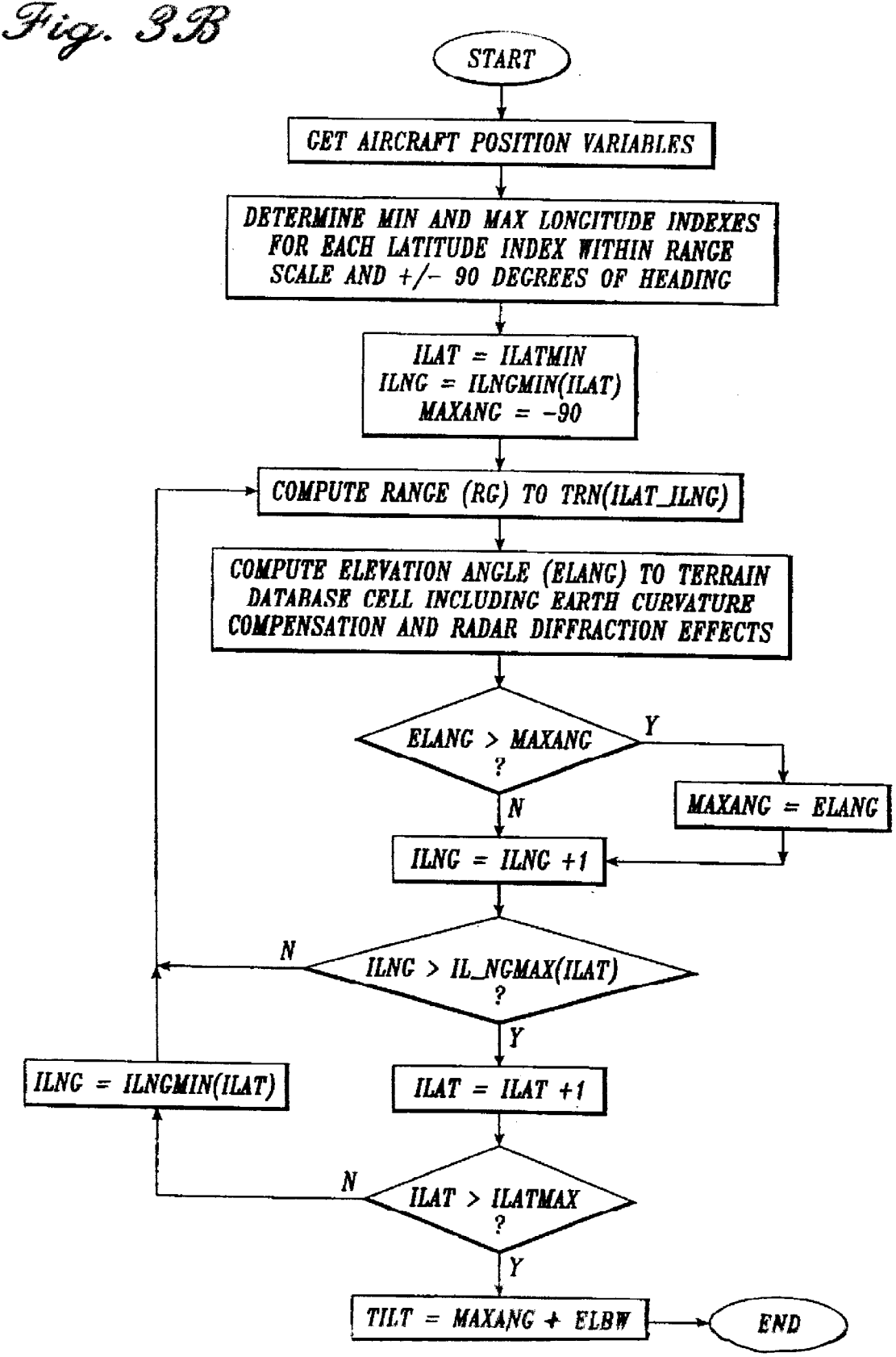
FIG. 3B is a flow chart of a tilt angle schedule.

According to another embodiment of the present invention, a terrain database is used to automatically calculate the tilt angle. One such database is included in the Enhanced Ground Proximity Warning System (EGPWS) manufactured by Honeywell International, Incorporated. Other databases may be used. This embodiment of the invention utilizes the inputs described below. FIG. 3B describes a tilt angle schedule using these inputs to one embodiment of the invention.

1. aircraft altitude for example, relative to sea level [alt]
2. aircraft position for example, in latitude [lat]
3. aircraft position for example, in longitude [lng]
4. terrain database [trn (ilat, ilng)] where ilat represents the latitude index and ilng represents the longitude index
5. radar range scale in for example, nautical miles (10, 20, 40, 80, 160, 320) [RS]
6. database cell size in for example, nautical miles (0.25, 0.5, 1.0, 2.0, 4.0) [CS]
7. half-power elevation beam width of the weather radar for example, in degrees (i.e., the angular distance from the main antenna axis—measured in the vertical plane containing the main antenna axis—at which the signal strength falls to half the maximum value) [elbw]
8. aircraft heading relative to north (where positive is clockwise from north) [hdg]

The schedule of FIG. 3B first determines the values of the aircraft position variables. Then, for each latitude index within the radar range scale and within 90 degrees of the aircraft heading, the minimum and maximum longitude indices within those same limits are determined. The latitude index is then set to the minimum latitude index within the range scale and within 90 degrees of the aircraft heading and the longitude index is set to the minimum longitude index within the range scale and within 90 degrees of the aircraft heading and intersecting the latitude index. A maximum angle variable (MaxAng) is created and set to negative 90 degrees. The schedule of FIG. 3B then computes the distance between the aircraft and the terrain database point that corresponds to the latitude and longitude indices.

Compensating for earth curvature and radar diffraction according to techniques known to those of skill in the art, the elevation angle between the aircraft and the terrain database cell (ElAng) is measured and compared to the maximum angle variable. If the elevation angle is greater than the maximum angle, the maximum angle is set equal to the elevation angle. If the elevation angle is not greater than the maximum angle, the longitude index is increased by one. The longitude index is then compared to the maximum longitude index within the range scale and within 90 degrees of the aircraft heading and intersecting the latitude index. If the longitude index is not greater than the maximum longitude index, then the algorithm loops back to the computation of the distance between the aircraft and the terrain database point that corresponds to the latitude and longitude indices. If the longitude index is greater than the maximum longitude index, then the latitude index is increased by one. The latitude index is then compared to the maximum latitude index within the range scale and within 90 degrees of the aircraft heading. If the latitude index is not greater than the maximum latitude index, then longitude index is set equal to the minimum longitude index within the range scale and within 90 degrees of the aircraft heading and intersecting the latitude index and the method loops back to the computation of the distance between the aircraft and the terrain database point that corresponds to the latitude and longitude indices. If the latitude index is greater than the maximum latitude index, then the tilt angle is calculated by adding the maximum angle to the half-power elevation beam width of the weather radar.

The weather radar's antenna tilt angle maybe recomputed each time the aircraft moves outside of a database cell, changes range scale or makes a change in aircraft heading.

Weather Uplinking and Display

According to one embodiment of the present invention, the invention includes a display 32 (FIG. 2A) for displaying the CAT information to the pilot. Display 32 may be a dedicated display but may also be a display shared with other functions, such as for example, weather radar, EFIS, FMS, EGPWS or any other aircraft display. In a preferred embodiment of the invention, a tactical display of weather data that includes CAT information may be displayed to the pilot. This display may optimally include weather and/or CAT data uplinked to the aircraft. The external data source may include ACARS, HF radio linked and other sources of data linking know to those of skill in the art.

In an alternate data architecture, a first aircraft collects local atmospheric data, in situ accelerations and other flight data as a function of aircraft position and altitude which is down-linked to a ground station. The ground station may also receive weather data from other ground based sources, satellite links, weather balloons and other weather gathering sources known to those of skill in the art. The down-linked information is used to assemble weather products based on, for example, National Center of Atmospheric Research models, and displayed in the ground station. According to one aspect of the invention, the invention provides multiple weather products, for example, turbulence, position, altitude, winds, temperature, severe cells from weather radar returns and other products. The ground station up-inks the weather products, for example, position, speed and track, and magnitude of significant weather to the originating aircraft and other aircraft. The weather products are received, displayed and stored until the next up-link is received.

The weather products up-linked, displayed and stored include, but are not limited to, significant weather. At the pilot's discretion and for tactical use, weather areas and in particular significant hazardous weather areas are displayed on a cockpit display. According to one embodiment of the invention, the pilot may manually select between display of the weather products information and the display of other information such as, for example, terrain, weather radar or EFIS map.

Figure 4A:
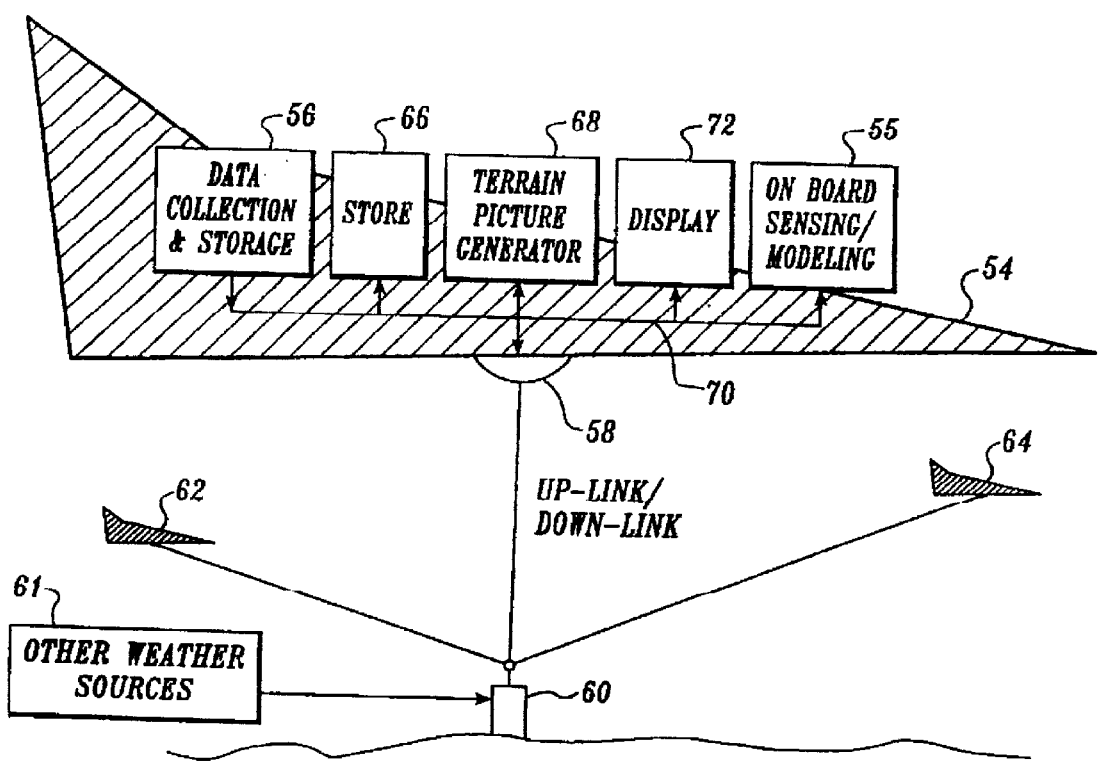
FIG. 4A illustrates a weather uplink and display architecture according one embodiment of the present invention.

FIG. 4A diagrams one possible data collection, up-link/down-link, weather product storage and display in an embodiment where aircraft also down-link information. In a preferred embodiment, the invention predominantly uses existing equipment. For example, in aircraft weather information system 10 shown in FIG. 4A, an aircraft 54 collects current local atmospheric data, in situ accelerations and other flight data as a function of aircraft position and altitude using existing on-board data sources 55, for example, on-board navigation data, altitude data, atmospheric data, sensor data and weather radar return data. The invention stores the data in a memory storage location 56. The data is down-linked via an antenna 58 to a ground station 60 where the data is used to assemble and refine weather products in conjunction with other available weather data 61. The weather products are up-linked to originating aircraft 54 and other aircraft 62, 64. The weather products are received and stored in a memory location 66 and converted to visual depictions using a picture generator 68, for example, an existing ground proximity terrain picture and symbol generator. The video data is transmitted via the existing weather video bus interface 70 and displayed on one or more existing cockpit color display devices 72, for example, an EFIS map and/or a weather radar display. Thus, it is possible to operate independently of the aircraft system level data bus and symbol generators.

In a preferred embodiment of the invention, icon images depicting and bounding significant hazardous weather are shown on existing color displays found in the cockpit. Each icon uniquely depicts a specific significant weather hazard area, for example, convective hazard areas, potential turbulence areas, winter precipitation areas or icing areas. According to one preferred embodiment of the invention, significant weather is displayed to a minimum range of 320 nautical miles along the aircraft's flight path. According to another preferred embodiment of the invention, significant weather is displayed to a minimum range of 640 nautical miles along the aircraft's flight path.

Figure 4B:
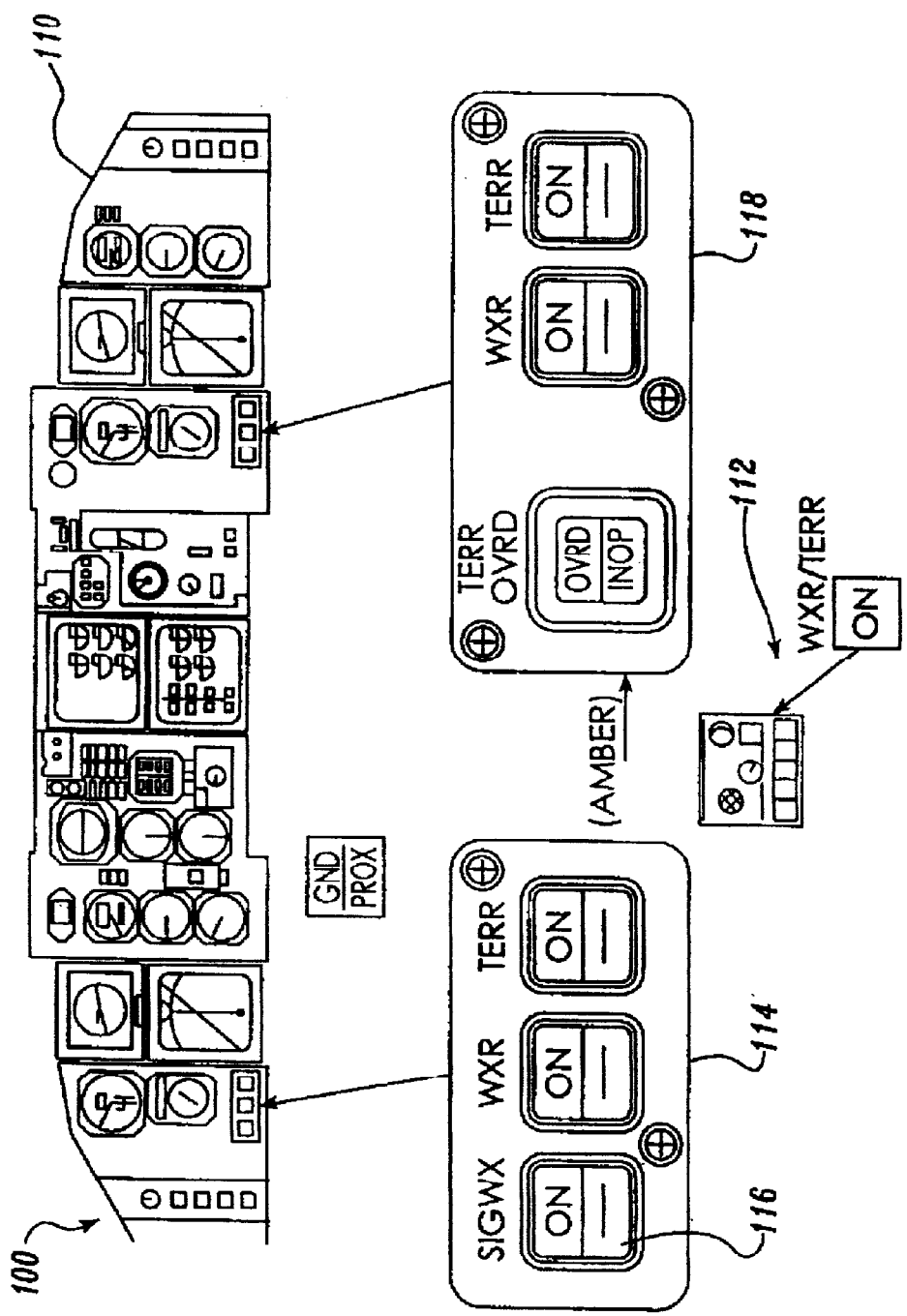
FIG. 4B illustrates a typical cockpit display installation according to one embodiment of the present invention.

FIG. 4B illustrates a typical cockpit installation 100. The particular cockpit installation depicted in FIG. 4B is a retrofit installation wherein an aircraft instrument panel 110 includes a ground proximity warning system accessed by weather radar/terrain switch 112. The pilot's ground proximity warning system switch panel 114 is modified to incorporate a on/off switch 116 whereby the pilot accesses the significant weather data upon command. Instrument panel 110 includes ground proximity warning system switch panel 118.

Weather radar video data bus 70 is, for example, a video data bus compliant with Aeronautical Radio, Incorporated (ARINC) standard 453, which incorporates a limited palette of colors and has limited bandwidth capabilities. Implementation of the invention using other video data buses is possible, however, and the invention itself is not so limited.

The icons displayed in one possible embodiment include a variety of polygons unique to a specific significant weather hazard, for example, convective hazard areas, potential turbulence areas, winter precipitation areas or icing areas. In one implementation, the icons are two-dimensional (2D) images indicating the weather hazard's geographic location relative to the aircraft. According to another embodiment of the invention, the icons are three-dimensional (3D) images indicating the weather hazard's altitude relation to the aircraft in addition to the weather hazard's relative geographic location.

Figure 4C:
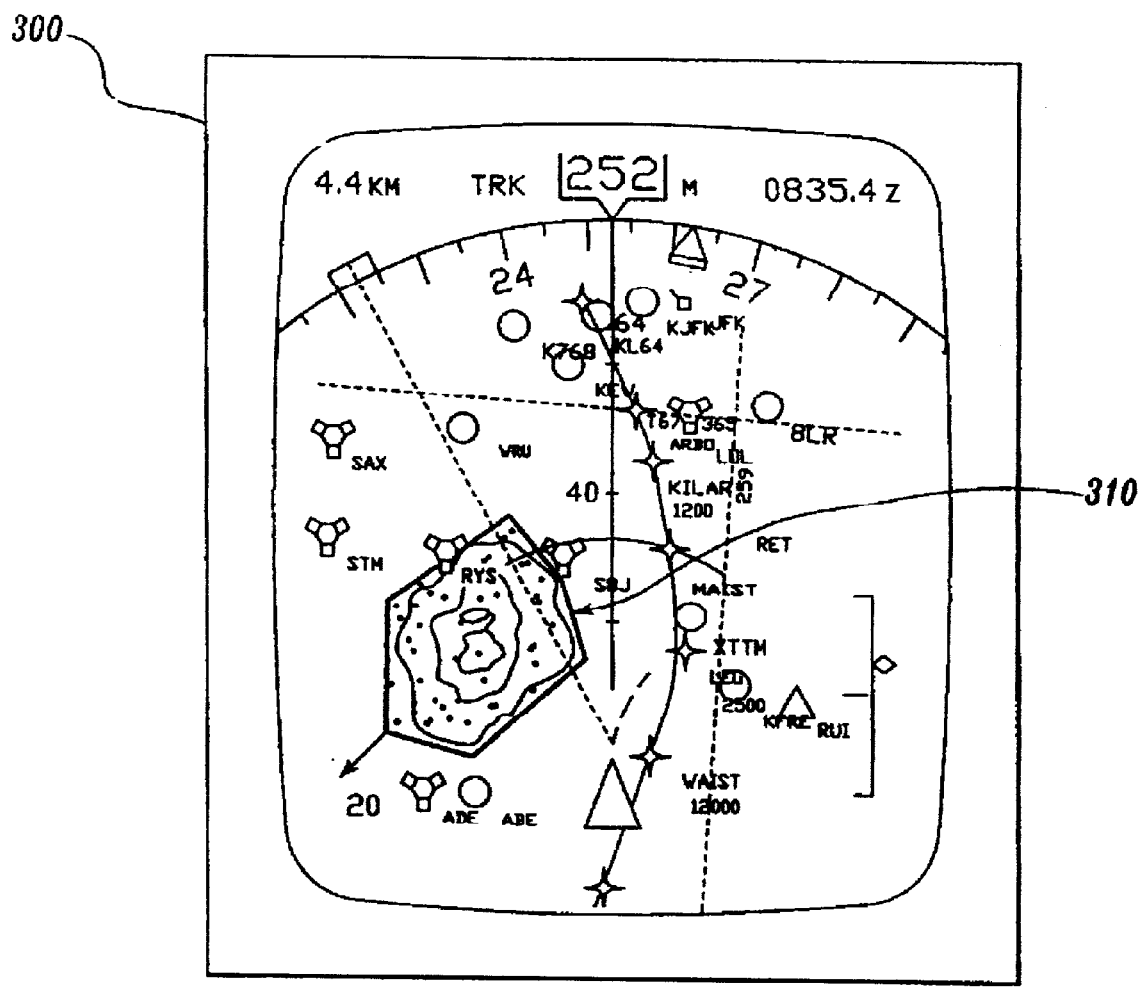
FIGS. 4C and 4D show examples of weather polygons according to one embodiment of the present invention.
Figure 4D:
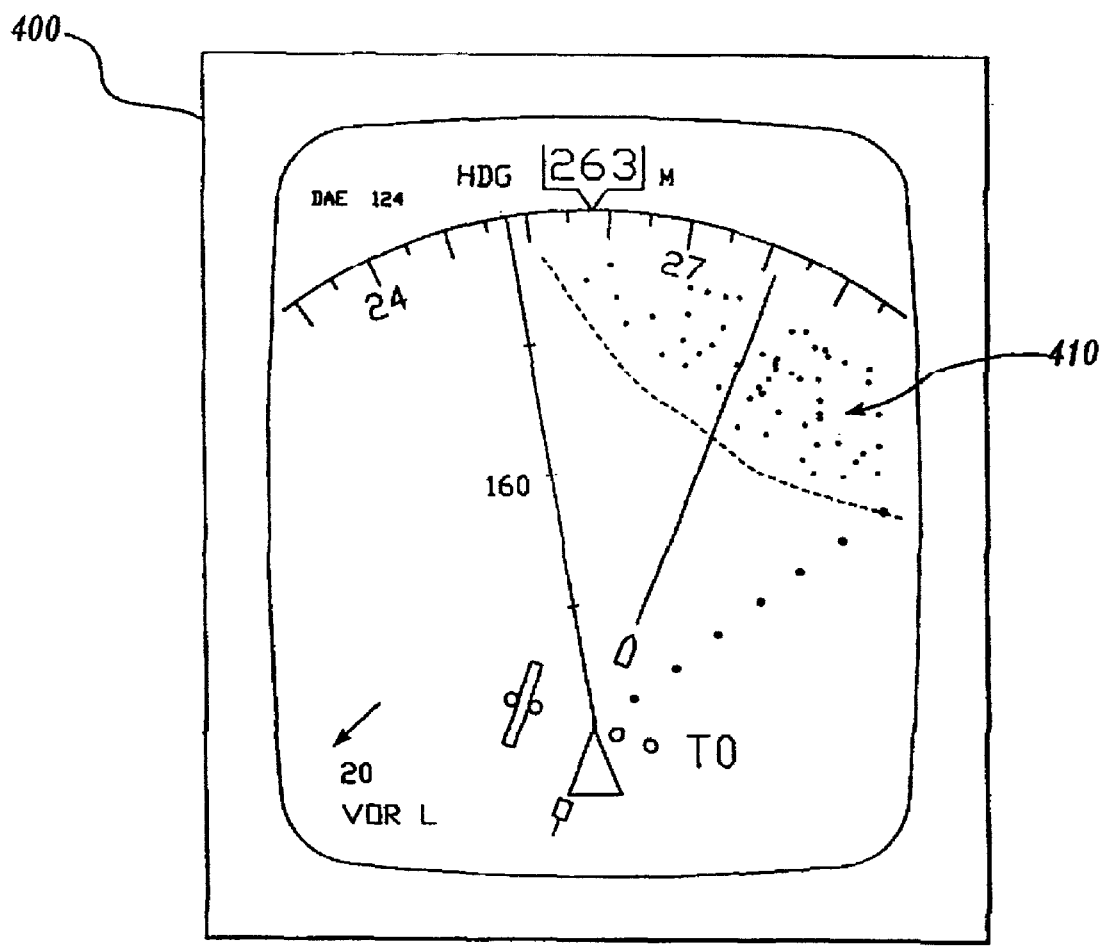
Figure 4E:
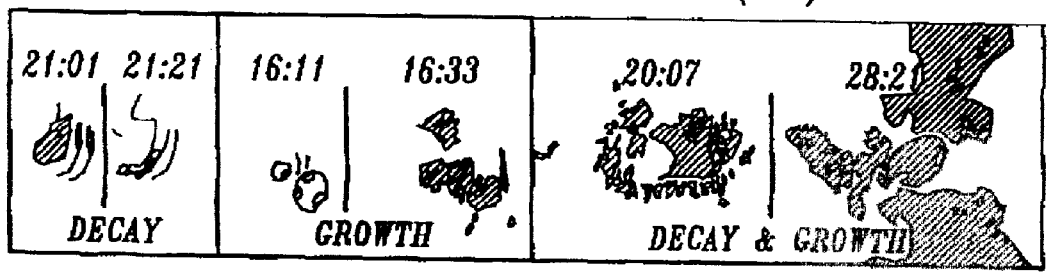
FIG. 4E illustrates a weather product.
Figure 4F:
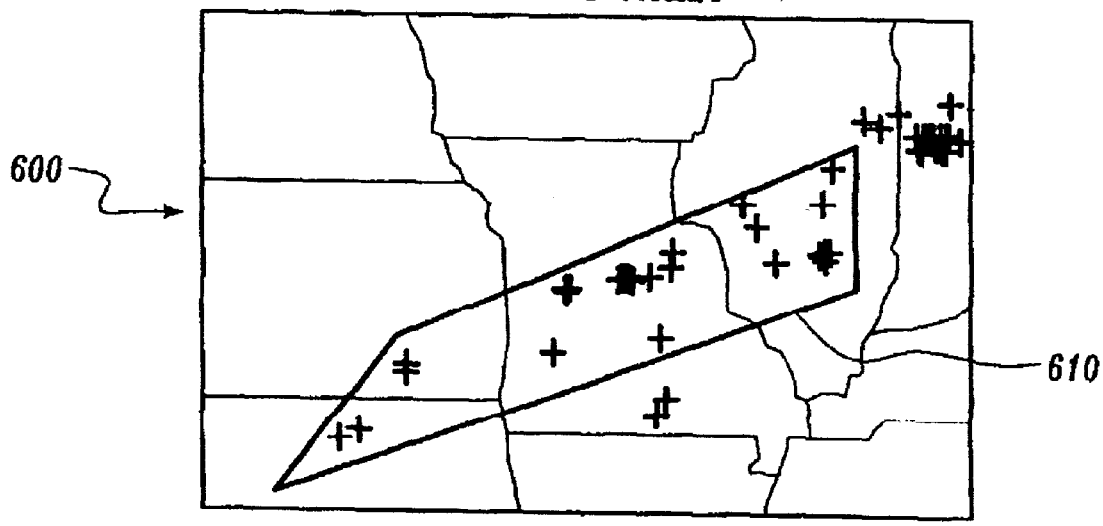
FIG. 4F illustrates another weather product, including an example of a weather polygon according to one embodiment of the present invention.

FIGS. 4C and 4D show examples of weather polygons according to the. FIG. 4C illustrates a cockpit display 300 selected to display data within an eighty nautical mile range of the aircraft. FIG. 4C includes an example of a 2D polygon-shaped image 310 depicting a predicted hazardous convectivity activity area. According to the invention, polygon-shaped image 310 is displayed in color, for example, polygon-shaped image 310 is displayed as a red polygon shape with red color dots. According to one preferred embodiment, the weather radar returns of cells lying within the hazardous convectivity activity area are displayed inside polygon-shaped image 310.

FIG. 4D illustrates another cockpit display 400 according to one embodiment of the invention selected to display data within a three hundred twenty nautical mile range. FIG. 4D includes an example of a unique 2D polygon-shaped image

410 depicting a predicted turbulence area. According to the invention, polygon-shaped image 410 is displayed in color, for example, polygon-shaped image 410 is displayed as a yellow polygon shape with yellow color dots.

On-Board Radar System and Scan Interleaving

An on-board radar system and techniques for scan interleaving suitable for use an on-board sensor to provide observational data in the preferred embodiments is disclosed in U.S. Pat. No. 5,831,570, assigned to the assignee of the present application, and is hereby incorporated by reference for all purposes.

The invention has now been described with reference to the preferred embodiments. Alternatives and substitutions will be apparent to persons of skill in the art. In particular, the algorithms and services for providing simulation data are exemplary only and not critical to practicing the invention. Alternatives will be known to persons of skill in the art and substitutes will continually be developed. Further, additional on-board sensors and off-boar sources of observational data will continually be developed. The particular type of sensor or data source is not critical to practicing the invention. Accordingly, it is not intended to limit the invention.

Additional Embodiment

As discussed herein, radar data alone is usually insufficient to give accurate nowcast of turbulence. This embodiment of the invention is a method for determining a nowcast of aviation turbulence utilizing other meteorological data to supplement radar data. Preferably, the method of this invention utilizes data input from an airborne weather detection and ranging, such as an "active" airborne weather radar or lidar sensor that emits energy into the atmosphere to detect the weather, in combination with minimal meteorological data obtained from the ground via data link or from other on-board sensors. Some of these useful meteorological data can only be obtained through uplinking data from a ground-based information source via a data link. However, the limited bandwidth of the data link means that very little of the possible gigabytes of storm data available from ground sources are able to be uplinked to the aircraft. This embodiment of the invention overcomes the difficulties associated with uplinking ground-based storm data by minimizing the amount of meteorological data required via data link.

The clear air turbulence nowcast system of the present invention includes a memory having clear air turbulence information stored therein as a function of various predetermined storm features; and also includes a processor coupled to the memory and adapted to receive a first signal representative of a return from an airborne weather detection and ranging sensor, such as radar or lidar, and a second signal representative of one or more predetermined meteorological data. The additional meteorological data are, for example, either uplinked weather detection and ranging data, such as radar data, originating from a ground-based source or one or more additional non-radar data originating from other on-board sensors or via uplink. The processor operates a set of machine instructions to determine a correlation between the compensated return signal from the weather detection and ranging system and one or more of the storm features; retrieve appropriate clear air turbulence information from the memory as a function of the correlation; and generate a nowcast of clear air turbulence as a function of the retrieved clear air turbulence information. Preferably, the retrieved clear air turbulence information is applied to a short-term prediction algorithm to provide a near-tern nowcast that estimates the probability, intensity, and location of CAT.

Alternatively, the additional meteorological data include information from "passive" sensor data, such as temperature, pressure, and wind speed, that is not discernible by an "active" airborne weather detection and ranging system, i.e., radar or lidar. The machine instructions operated by the processor determine a correlation between the uncompensated airborne active weather detection and ranging signal and one or more of the storm features; retrieve appropriate clear air turbulence information from the memory as a function of the correlation; and combine the additional meteorological data with the airborne weather detection and ranging data to generate the nowcast of clear air turbulence as a function of both the modified clear air turbulence information and the additional meteorological data gathered from data link or other on-board sensors. The retrieved clear air turbulence information is preferably applied to a short-term prediction algorithm to provide a near-term nowcast that estimates the probability, intensity, and location of CAT.

Although the invention description herein is primarily directed to an airborne weather radar system, the invention is not intended to be so limited. Rather, the invention is also used with other "active" airborne weather detection and ranging, such as a lidar system. Thus, reference to a radar system is intended only to simplify the description rather than as a limitation to the scope of the invention.

Develop "Storm Data Bank" of Storm Morphology

Clear air turbulence or CAT is the eddies and currents surrounding a storm. Updrafts and downdrafts within the wet air of the storm create these eddies and currents, which can extend for as much 10 to 20 km above and outside the wet air of the storm. As mentioned above, this CAT is invisible to radar. According to the invention, computer models of storms scenarios, including detailed studies of the air velocities within the storm, provide descriptions of the CAT surrounding the storm. In a preferred embodiment, a set of storm scenarios are generated through meteorological modeling to form a "storm data bank." The storm bank preferably contains most storm features encountered by airplanes.

Development of the storm data bank preferably includes study of a set of typical weather scenario, including supercell thunderstorms, single-cell thunderstorms, multicell thunderstorms, hybrid thunderstorms, and squall line systems. Most storms generating the CAT of interest last about 2 hours or less. Supercell thunderstorms are on the other hand single, quasi-steady storms that persist for more than 2 hours. They consist of a strong, single updraft/downdraft pair that create a strong, sustained, upper level shear, the updraft often having a velocity of more than 50 m/s, and the downdraft having velocities of 30–40 m/s. The updraft region is coincident with an area of little precipitation surrounded by area of strong precipitation that wraps around this center in a rotating storm and creates the hook-echo region seen in radar reflectivity. The vertical extent of a supercell storm is up to 12 km, while the horizontal extent is in the range of 15–25 km. A large anvil region develops at tropopause level as air parcels lose their buoyancy and fan out being carried downstream by the prevailing wind at this level. As winds interact with the storm, there is a wake of turbulence downstream, which can extend beyond the area defined by the storm itself. Single-cell thunder storms on the other hand are short lived and create no windshear. Multicell thunder storms are continuously developing and develop a weaker shear than the supercell. Hybrid thunderstorms are any combination of the single-cell, multi-cell and supercell thunderstorms.

These weather scenarios representing major storm scenarios are preferably generated using meteorological data in one of the well-known numerical simulation models, such as the Advanced Regional Prediction System (ARPS) model. Time influences the predicted CAT because the storm's characteristics change as it develops and ages. Therefore, the storm data bank includes the storm development and morphology over the life time of the storm. Thus, the scenario data preferably contain most storm features encountered by aircraft.

Correlate Turbulence With Storm Morphology

The detailed storm data are examined to determine the location, extent and intensity of CAT associated with each storm, and each phase of the storm. The descriptions of CAT are catalogued as a function of predetermined parameters, such as the type of storm and the changing three-dimensional structure of the storm over time, including the changing extent, pattern, shape, intensity, and moving direction of the storm, all over the life time of the storm.

Storm morphology and turbulence characteristics are correlated using a quantitative relationship. Correlation is established between storm morphology and turbulence properties, including: intensity, location, time and probability of occurrence. Correlation is established using any suitable approach. Although two correlation methods are disclosed herein, the disclosed method are not intended to limit the scope of the invention; rather, other suitable methods are contemplated by the invention. Correlation is preferably established using one of a computer model and an analytical model based on quantitative "rules of thumb" and their underlying physics.

According to the computer model correlation method of the invention, meteorologists, such as, for example, those at the University of Oklahoma, supply simulation data and storm analysis. The analysis identifies turbulence and its relation to storm development and morphology. The interaction of such storms with the meteorological environment and the resulting turbulence provide a non-random relationship between storms and the associated turbulence.

The analytical model correlation method of the invention is based on many "rules of thumb" that are described in literature discovered in literature surveys. Most of these rules are supported by physical laws that govern the relations between storm development and turbulence. These "rules of thumb" associate radar return characteristics with turbulence.

Nowcast Correlation Algorithm

A suitable correlation method is used in a nowcast correlation algorithm to recognize features of a radar return to identify the storm and predict the location, extend and intensity of CAT. For example, a neural network is used to train the computer to recognize the storm based on radar data. Optionally, the neural network uses other additional information to recognize the storm. Pattern recognition is another method by which the computer recognizes the storm. Preferably, correlation data between the radar return from the on-board weather radar and radar return simulations using the "storm data bank" is utilized to identify the storm. Optionally, minimal additional meteorological information uplinked from ground-based radar is combined with the returns from the on-board radar to compensate the airborne radar data. Thus, the airborne radar data more accurately reflect the current meteorological conditions and a more robust correlation is possible, resulting in a more precise identification of the storm and prediction of CAT.

A radar simulator is a well-known tool used to simulate the two-dimensional power return from radar. According to the invention, the simulator is used to examine the storms in the storm data bank from various directions of approach and various radar tilt angles. The radar simulation data include the spatial and temporal variations of reflectivity over scanned areas of the storms. A set of parameters are determined as a function of the radar simulation data. These parameters preferably include the extent of the storm, the pattern of the storm, and the change of storm shape, intensity, and moving direction over time. These parameters are stored as a set of identifying storm data. These parameters are stored, for example, as a set of templates.

As noted above, the present invention is also used with other suitable weather detection and ranging systems. Accordingly, the stored templates are alternatively the result of lidar simulations of the storms in the storm bank. The lidar simulations also include spatial and temporal variations of examinations of the storms from various directions and tilt angles. Minimal additional lidar information is optionally uplinked from ground-based sources and combined with the returns from the on-board lidar to compensate the airborne lidar data. Thus, the on-board weather detection and ranging sensor data are either the power returns of a weather radar or of a lidar.

In operation, a virtual three-dimensional storm structure is constructed based on the two-dimensional radar return data and other information. According to one embodiment of the invention, the additional uplinked information originates from ground-based radar and includes one or more of the above mentioned spatial and temporal storm data, such as the age and extent of the storm. One of the primary uses of the additional uplinked meteorological data is to correct the depth of the storm that is ahead of the aircraft. Electromagnetic energy absorption by water drops or ice can cause the "depth" of a storm, i.e., its extension ahead of the aircraft, to appear less than it actually is. For example, a storm that is 50 km deep may appear on the on-board weather radar display to be only 30 km deep. The uplinked radar data is, therefore, used to correct the shape, primarily the depth, of the storm displayed on the radar screen. Key storm features are extracted from the compensated radar return data. A correlation algorithm compares these radar data derivatives with the templates of storm data stored in the storm data bank to identify the storm and retrieve the corresponding CAT data.

The identified storm features are preferably applied to a short-term prediction algorithm to form a nowcast that estimates the probability, intensity, and location of CAT as a function of the correlation between the returns of the on-board weather radar, either compensated or uncompensated, and the radar simulations contained in the storm data bank. According to this embodiment of the present invention, in practice, the nowcast algorithm retrieves key storm features or "finger prints" from the compensated radar return. The algorithm matches the modified radar data with the identifying features stored in the storm data bank. Based upon the matches found, the nowcast algorithm determines the type of storm and retrieves the corresponding CAT data. Optionally, the data is applied to a short-term prediction algorithm to estimate near-term changes in the predicted probability, intensity, and location of CAT. The nowcast algorithm generates an alert to the pilot of CAT occurring along the flight path of the aircraft. The alert allows the pilot adequate time to react by avoiding the dangerous area completely, choosing the best route to minimize the impact of turbulence encounter, or warning the passengers and crew if the CAT can not be avoided.

Compensated or uncompensated, the radar data is primarily a measure of the location and the amount of water in the storm and may not reveal sufficient data for generating a nowcast. Other types of additional meteorological information, such as temperature, pressure, and wind speed adds dimension to the limited information provided by radar. Thus, according to another embodiment of the invention, additional meteorological data obtained either from other on-board sensors or via the data link compensates the radar data by expanding it with added detail. Accordingly, minimal additional meteorological data are utilized by the nowcast algorithm to compensate the airborne radar return data before correlation with the storm data bank. As when operated using airborne radar data compensated with ground-based radar data, the nowcast algorithm correlates the airborne radar data, compensated with non-radar data from other on-board sensors or uplinked from ground sources, with storm features in the storm data bank to identify the storm and retrieve corresponding CAT data. The minimal additional compensation data combined with the returns from the on-board sensors again results in data that more accurately reflect the current meteorological conditions. Thus, a More robust correlation is possible, resulting in a more precise identification of the storm and prediction of CAT. As described above, the identified storm features are applied to a short-term prediction algorithm to form a nowcast that estimates the probability, intensity, and location of CAT as a function of the correlation between the radar return data and the radar simulations contained in the storm data bank.

Alternatively, the additional meteorological data are utilized by the nowcast algorithm to compensate the prediction results obtained using the radar data, rather than compensate the radar data directly. In other words, minimal additional meteorological data are utilized by the nowcast algorithm to modify the result of a nowcast that is based on a correlation of the radar return data with storm features in the storm data bank. The additional meteorological data are obtained from either or both of other on-board sensors or via uplink. The additional meteorological data are non-radar data and preferably include information that is not discernible by airborne radar. For example, the additional meteorological data include information such as temperature, pressure, and wind speed.

Predetermined storm features are extracted from the uncompensated airborne radar data and compared with the data in the storm data bank. The storm features identified by the correlation algorithm are combined with the additional meteorological data. The combined data are applied to a short-term prediction algorithm to form a nowcast that estimates the probability, intensity, and location of CAT. Thus, the CAT data are determined as a function of the correlation between the returns of the on-board weather radar and the radar simulations contained in the storm data bank in combination with minimal additional meteorological data gathered either from other on-board sensors or via data link from a ground information source. The additional meteorological data are current data used to modify results of the short-term prediction algorithm. As discussed above, the uplinked meteorological data is primarily used to correct the shape of the storm displayed on the radar screen.

FIG. 5 illustrates the method of the present invention. The CAT nowcast system is configured similarly to the CAT nowcast system shown in FIG. 1E and described above. The CAT nowcast system of the present invention includes on-board computer (OBC) 1, on-board storage 3, and at least one of data link 5 and on-board sensors 4. The on-board computer 1 processes on-board radar return and minimal additional meteorological data, either generated by the on-board sensors 4 or uplinked via the data link 5, to nowcast CAT along the flight path. On-board instrumentation 2 is coupled to the on-board computer 1 to alert the pilot of CAT.

On-board computer 1 executes software that implements the correlation algorithm and CAT nowcast as described above. The nowcast information is provided to cockpit instrumentation 2 which provides aural and/or visual CAT nowcast alerts to a pilot. On-board storage 3 is used to store pre-loaded storm data bank containing storm identifying features from the radar simulations, corresponding turbulence information, and program code. At least one of on-board sensors 4 and a data-link 5 provide additional meteorological data to on-board computer 1.

The algorithm 700 is a software application operated by the on-board computer 1. In FIG. 5, radar return data are inputs to the algorithm 700 at extraction function 710. According to one embodiment of the invention, additional radar data are uplinked from ground-based radar sources to compensate the airborne radar data. According to another embodiment, additional non-radar meteorological data is obtained from one or both of other on-board sensors and via uplink. The additional meteorological data adds additional dimension to the airborne radar data. The extraction function 710 extracts key features from the compensated radar return. A comparison function 720 correlates the extracted features and meteorological data with stored radar simulation data to determine the storm development and morphology and the currently existing meteorological environment. This information is used at 730 to retrieve corresponding CAT data, which is applied to a short-term prediction algorithm 740 that forms a nowcast of CAT along the flight path. Short-term prediction algorithm 740 estimates the CAT properties, such as intensity, location, time and probability of occurrence. The CAT nowcast is supplied to on-board computer 1 to alert the pilot of CAT.

According to one alternative embodiment, the uncompensated airborne radar data are applied to extraction function 710, which extracts key storm features therefrom. The extracted storm features are similarly applied to comparison function 720, which correlates the extracted features with stored radar simulation data to determine the storm development and morphology and the currently existing meteorological environment. This information is used at 730 to retrieve corresponding CAT data. The retrieved CAT data are combined with minimal additional meteorological data as inputs to a short-term prediction algorithm 740 to form a nowcast of CAT along the flight path, as discussed above.

While the preferred embodiment of the invention has been illustrated and described, it will be appreciated that various changes can be made therein without departing from the spirit and scope of the invention.

What is claimed is:

1. A clear air turbulence nowcast system comprising:
   a memory having clear air turbulence information stored therein as a function of predetermined storm features; and
   a processor coupled to said memory, said processor receiving each of a signal representative of a return of an airborne weather detection and ranging sensor and signal representative of one or more additional meteorological data, wherein said process:
   a) compensates said weather detection and ranging sensor return signal using said meteorological data;
   b) determines a correlation between said compensated weather detection and ranging sensor return signal and one or more of said storm features,
   c) retrieves said clear air turbulence information as a function of sad correlation, and d) generates a nowcast of clear air turbulence as a function of said clear air turbulence information.

2. The system recited in claim 1, wherein said processor further generates an output signal representative of said nowcast.

3. The system recited in claim 2, wherein said processor is further:
   extracts key features from said weather detection and ranging sensor return signal, and
   correlates said key features with said one or more storm features.

4. The system recited in claim 3, wherein said meteorological data further comprise one or more data generated by an alternate weather detection and ranging source.

5. The system recited in claim 3, wherein said processor further employs a short-term prediction algorithm for generating said nowcast.

6. The system recited in claim 5, wherein said nowcast of clear air turbulence further comprises one or more of an intensity, a location, a time, and a probability of occurrence of clear air turbulence.

7. The system recited in claim 3, wherein said processor further generates an output alert signal as a function of said nowcast.

8. A clear air turbulence nowcast system comprising:
   a memory having stored therein:
      a) storm data bank of one or more storm templates, and
      b) clear air turbulence information stored therein as a function of said storm templates;
   a processor coupled to said memory, said processor receiving each of a signal representative of returns of a weather detection and ranging sensor and a signal representative of one or more additional meteorological data, wherein said processor executes so are that:
      a) compensates said weather detection and ranging sensor return signal as a function of said meteorological data,
      b) extracts key features from said compensated weather detection and ranging sensor return signal,
      c) correlates said compensated key features with storm features stored in one or more of said storm templates;
      d) retrieves said clear air turbulence information from said memo as a function of said correlation, and
      e) generates a nowcast of clear air turbulence as a function of a short-term prediction algorithm.

9. The system recited in claim 8, wherein said clear air turbulence information stored in said memory further comprise information stored therein as a function of returns of simulations applied to typical storm scenarios generated through meteorological modeling.

10. The system recited in claim 9, wherein said nowcast of clear air turbulence further comprises one or more of an intensity, a location, a time, and a probability of occurrence of clear air turbulence.

11. The system recited in claim 10, wherein said processor further executes software which generates an output alert signal as a function of said nowcast.

12. An electronic circuit generating a clear air turbulence nowcast using on-board weather detection and ranging sensor data and minimal additional meteorological data, the electronic circuit comprising:
   a) a memory for storing:
      i) a plurality of machine instructions,
      ii) weather detection and ranging sensor data,
      iii) additional current meteorological data, and
      iv) clear air turbulence information as a function of predetermined storm features; and
   b) a processor coupled to said memory, said processor executing said plurality of machine instructions to implement a plurality of functions, said functions comprising:
      i) modifying key features of said weather detection and ranging sensor data as a function of said additional current meteorological data,
      ii) extracting said modified key features from said weather detection and ranging sensor data,
      iii) comparing said modified key features to said predetermined storm features;
      iv) retrieving said clear air turbulence information as a function of said correlation; and
      v) generating a nowcast of clear air turbulence as a function of said clear air turbulence information.

13. The electronic circuit recited in claim 12, wherein said predetermined storm features further comprise storm features retrieved from a bank of storm features stored in said memory.

14. The electronic circuit recited in claim 13, wherein said meteorological data further comprise one or more of weather detection and ranging sensor data obtained from an alternate source and non-radar meteorological data.

15. The electronic circuit recited in claim 14, wherein said nowcast generating function further comprises operating a short-term weather prediction algorithm.

16. The electronic circuit recited in claim 14, wherein said nowcast of clear air turbulence further comprises a nowcast of one or more of an intensity, a location, a time, and a probability of occurrence of clear air turbulence.

17. The electronic circuit recited in claim 16, further comprising the function of generating an output alert signal as a function of said nowcast.

18. A method for using an electronic circuit to generate a clear air turbulence nowcast using meteorological data conveyed as a power return signal from an on-board weather detection and ranging sensor system and minimal additional meteorological data, the method comprising:
   a) processing the signal as a weather detection and ranging sensor signal;
   b) with the electronic circuit, extracting key features from said weather detection and ranging sensor signal;
   c) with the electronic circuit, compensating said key features as a function of current meteorological data;
   d) with the electronic circuit, correlating said compensated key features with predetermined storm features;
   e) with the electronic circuit, retrieving clear air turbulence information as a function of said correlation; and
   f) with the electronic circuit, generating a nowcast of clear air turbulence as a function of said clear air turbulence information.

19. The method recited in claim 18, wherein said predetermined storm features further comprise storm features retrieved from a stored bank of storm features.

20. The method recited in claim 19, wherein said meteorological data further comprise one or more of data from a ground-based radar system and a ground-based lidar system.

21. The method recited in claim 20, wherein said generating a nowcast further comprises operating a short-term weather prediction algorithm for generating said nowcast.

22. The method recited in claim 21, wherein said nowcast of clear air turbulence further comprises one or more of an intensity, a location, a time, and a probability of occurrence of clear air turbulence.

23. The method recited in claim 22, further comprising generating with the electronic circuit an output alert signal as a function of said nowcast.

24. A clear air turbulence nowcast system comprising:
a memory having clear air turbulence information stored therein as a function of predetermined storm features; and
a processor coupled to said memory, said processor receiving each of a signal representative of a return from an airborne weather detection and ranging sensor and signal representative of one or more additional meteorological data, wherein said processor:
a) extracts key features from said airborne weather detection and ranging sensor signal,
b) determines a correlation between said extracted features and one or more of said storm features,
c) retrieves said clear air turbulence information as a function of said correlation,
d) generates a nowcast of clear air turbulence as a function of said clear air turbulence information and said additional meteorological data.

25. The system recited in claim 24, wherein said processor further generates an output signal representative of said nowcast.

26. The system recited in claim 25, wherein said meteorological data further comprise one or more of data generated by one or more alternate on-board sensors and data uplinked from one or more alternate sources.

27. The system recited in claim 26, wherein said processor further employs a short-term prediction algorithm for generating said nowcast.

28. The system recited in claim 27, wherein said nowcast of clear air turbulence further comprises one or more of an intensity, a location, a time, and a probability of occurrence of clear air turbulence.

29. The system recited in claim 28, wherein said processor generates an output alert signal as a function of said nowcast.

30. A clear air turbulence nowcast system comprising:
a memory having stored therein:
a) storm data bank of predetermined storm features, and
b) clear air turbulence information stored therein as a function of said predetermined storm features;
a processor coupled to said memory, said processor receiving each of a signal representative of returns of an airborne weather detection and ranging sensor and a signal representative of one or more additional current meteorological data, wherein said processor executes software that:
a) determines key features from said airborne weather detection an ranging sensor signal,
b) correlates said key features with said predetermined storm features;
c) retrieves said clear air turbulence information from said memory as a function of said correlation, and
d) generates a nowcast of clear air turbulence as a function of a short-term prediction algorithm.

31. The system recited in claim 30, wherein said clear air turbulence information stored in said memory further comprise information stored therein as a function of returns of simulations applied to typical storm scenarios generated through meteorological modeling.

32. The system recited in claim 31, wherein said nowcast of clear air turbulence further comprises one or more of an intensity, a location, a time, and a probability of occurrence of clear air turbulence.

33. The system recited in claim 32, wherein said processor further executes software which generates an output alert signal as a function of said nowcast.

34. An electronic circuit generating a clear air turbulence nowcast using on-board weather detection and ranging sensor data and minimal additional meteorological data, the electronic circuit comprising:
a) a memory for storing:
i) a plurality of machine instructions,
ii) weather detection and ranging sensor data,
iii) additional current meteorological data, and
iv) clear air turbulence information as a function of predetermined storm features; and
b) a processor coupled to said memory, said processor executing said plurality of machine instructions to implement a plurality of functions, said functions comprising:
i) extract key features from said on-board weather detection and ranging sensor corresponding to said predetermined storm features,
ii) extracting said key features from said on-board weather detection and ranging sensor data,
iii) correlating said key features to said predetermined storm features;
iv) retrieving said clear air turbulence information as a function of said correlation;
v) retrieving said additional current meteorological data, and
vi) generating a nowcast of clear air turbulence as a function of said clear air turbulence information and said additional current meteorological data.

35. The electronic circuit recited in claim 34, wherein said predetermined storm features further comprise storm features retrieved from a bank of storm features stored in said memory.

36. The electronic circuit recited in claim 35, wherein said meteorological data further comprise one or more of a temperature, a pressure, and a wind speed.

37. The electronic circuit recited in claim 36, wherein said nowcast generating function further comprises operating a short-term weather prediction algorithm.

38. The electronic circuit recited in claim 37, wherein said nowcast of clear air turbulence further comprises a nowcast of one or more of an intensity, a location, a time, and a probability of occurrence of clear air turbulence.

39. The electronic circuit recited in claim 38, further comprising the function of generating an output alert signal as a function of said nowcast.

40. A method for using an electronic circuit to generate a clear air turbulence nowcast using meteorological data conveyed as a power return signal from an on-board weather detection and ranging sensor system and minimal additional meteorological data, the method comprising:
a) processing the signal as a weather detection and ranging sensor signal;
b) with the electronic circuit, extracting key features from said weather detection and ranging sensor signal;
c) with the electronic circuit, correlating said key features to predetermined storm features;
d) with the electronic circuit, retrieving clear air turbulence information as a function of said correlation;
e) with the electronic circuit, retrieving additional meteorological data, and
f) with the electronic circuit, generating a nowcast of clear air turbulence as a function of said clear air turbulence information and said additional meteorological data.

41. The method recited in claim 40, wherein said predetermined storm feature further comprise storm features retrieved from a stored bank of storm features.

42. The method recited in claim 41, wherein said meteorological data further comprise one or more of an age a weather condition and an extent of a weather condition of interest.

43. The method recited in claim 42, wherein said generating a nowcast further comprises operating a short-term weather prediction algorithm for generating said nowcast.

44. The method recited in claim 43, wherein said nowcast of clear air turbulence further comprises one or more of an intensity, a location, a time, and a probability of occurrence of clear air turbulence.

45. The method recited in claim 44, further comprising generating with the electronic circuit an output alert signal as a function of said nowcast.

* * * * *